Sept. 19, 1939. A. WEISS Re. 21,212

ROTARY INTAGLIO PRINTING

Original Filed July 22, 1933 9 Sheets-Sheet 1

INVENTOR
Adolph Weiss
BY Wood Crosby & Neal
his ATTORNEYS

ROTARY INTAGLIO PRINTING

Original Filed July 22, 1933 9 Sheets-Sheet 2

INVENTOR
Adolph Weiss
BY Frank Crosby & Neal
his ATTORNEYS

Sept. 19, 1939. A. WEISS Re. 21,212

ROTARY INTAGLIO PRINTING

Original Filed July 22, 1933 9 Sheets-Sheet 3

INVENTOR
Adolph Weiss
BY Wood Crosby & Neal
his ATTORNEYS

Sept. 19, 1939. A. WEISS Re. 21,212

ROTARY INTAGLIO PRINTING

Original Filed July 22, 1933 9 Sheets-Sheet 4

INVENTOR
Adolph Weiss
BY Ward Cady & Mack
his ATTORNEYS

ROTARY INTAGLIO PRINTING
Original Filed July 22, 1933 9 Sheets-Sheet 5
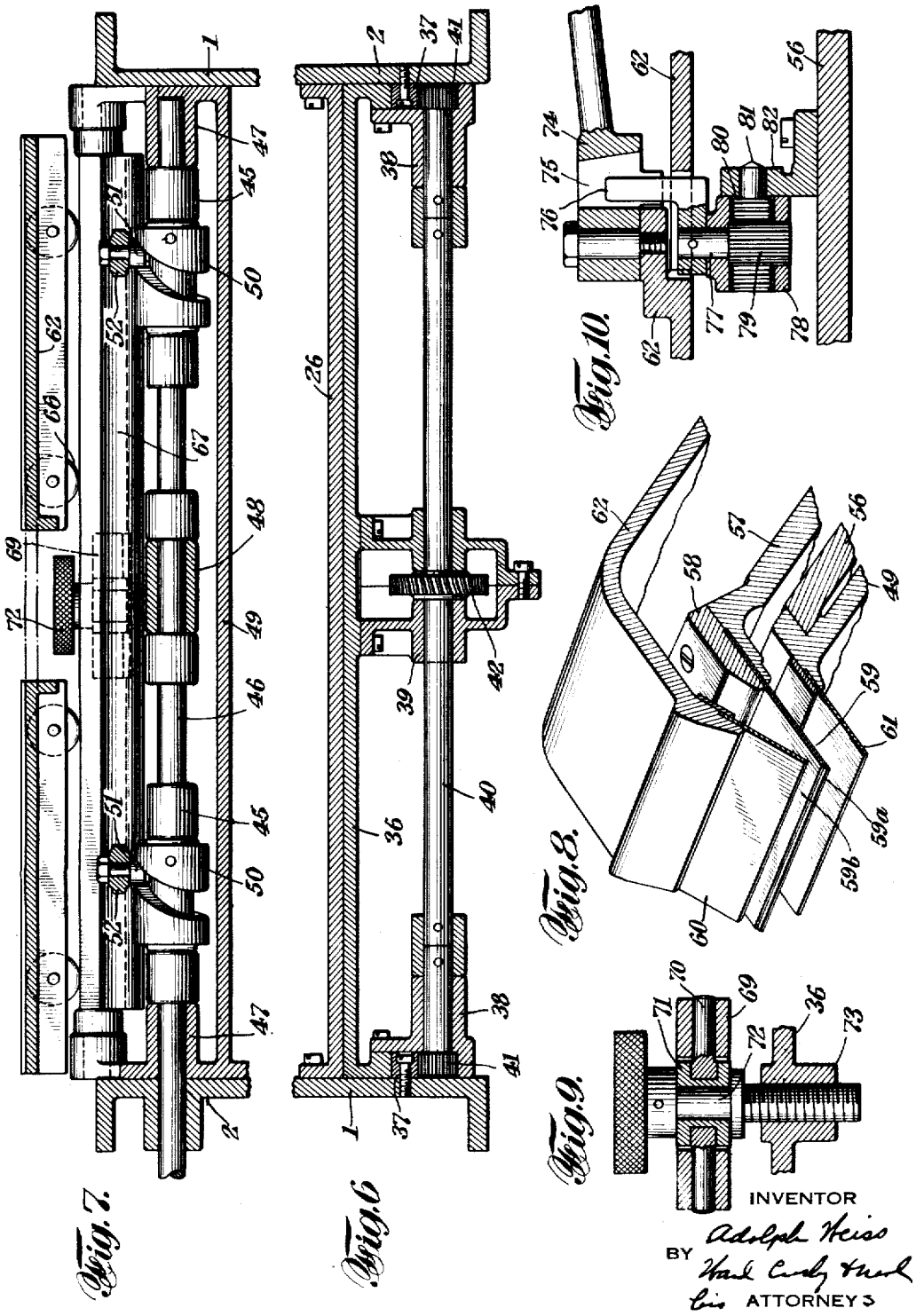
INVENTOR
Adolph Weiss
BY
Wood Crosby Freed & Marshall
ATTORNEYS

ROTARY INTAGLIO PRINTING

Original Filed July 22, 1933 9 Sheets-Sheet 6

INVENTOR
Adolph Weiss
BY Wood Crosby & Neal
his ATTORNEYS

ROTARY INTAGLIO PRINTING
Original Filed July 22, 1933 9 Sheets-Sheet 7
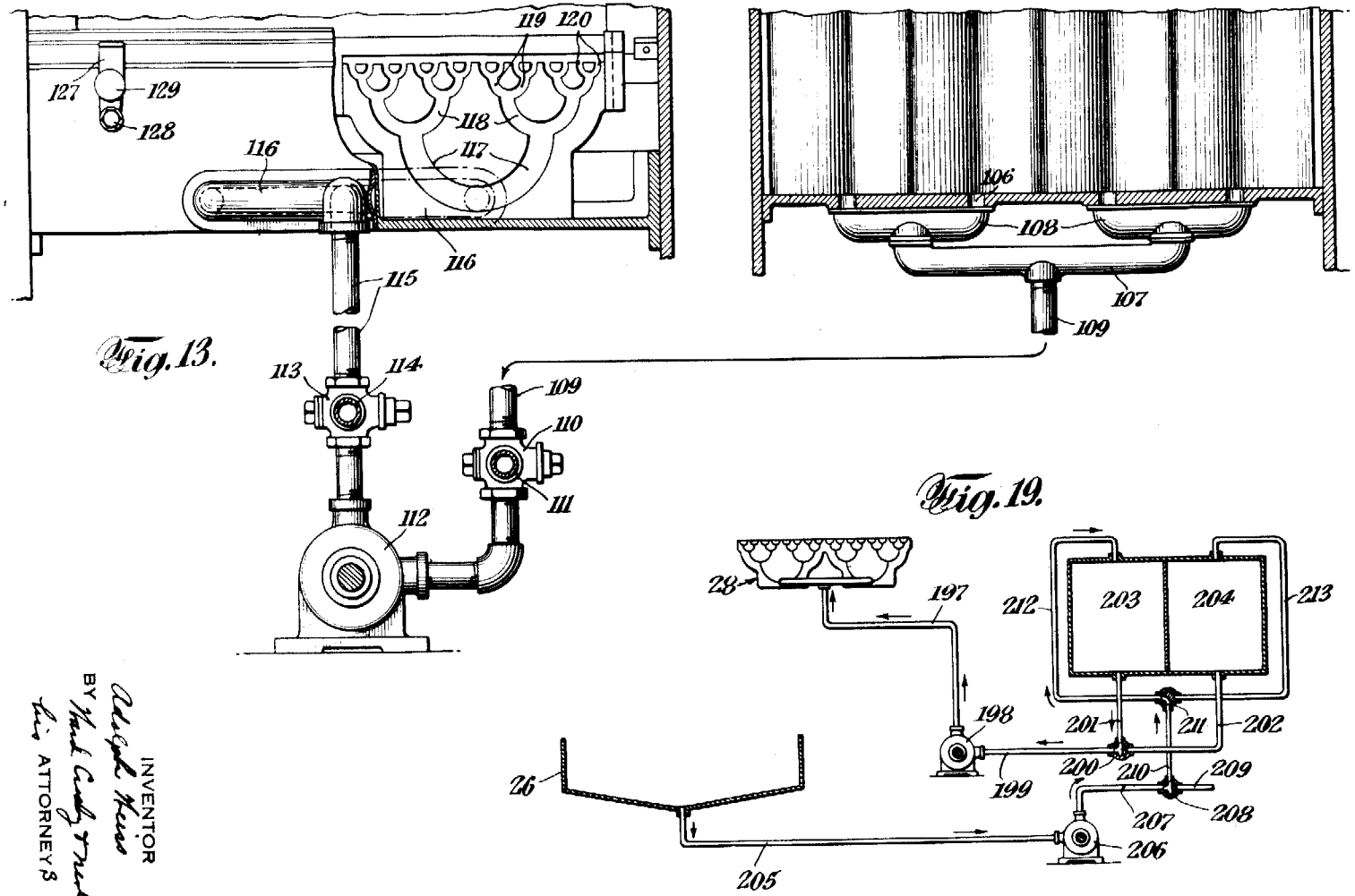
INVENTOR
Adolph Weiss
BY Hard Cady & Neal
his ATTORNEYS Sept. 19, 1939. A. WEISS Re. 21,212

ROTARY INTAGLIO PRINTING

Original Filed July 22, 1933 9 Sheets-Sheet 8

INVENTOR
Adolph Weiss
BY Ward Cooley & Neal
his ATTORNEYS

ROTARY INTAGLIO PRINTING
Original Filed July 22, 1933 9 Sheets-Sheet 9
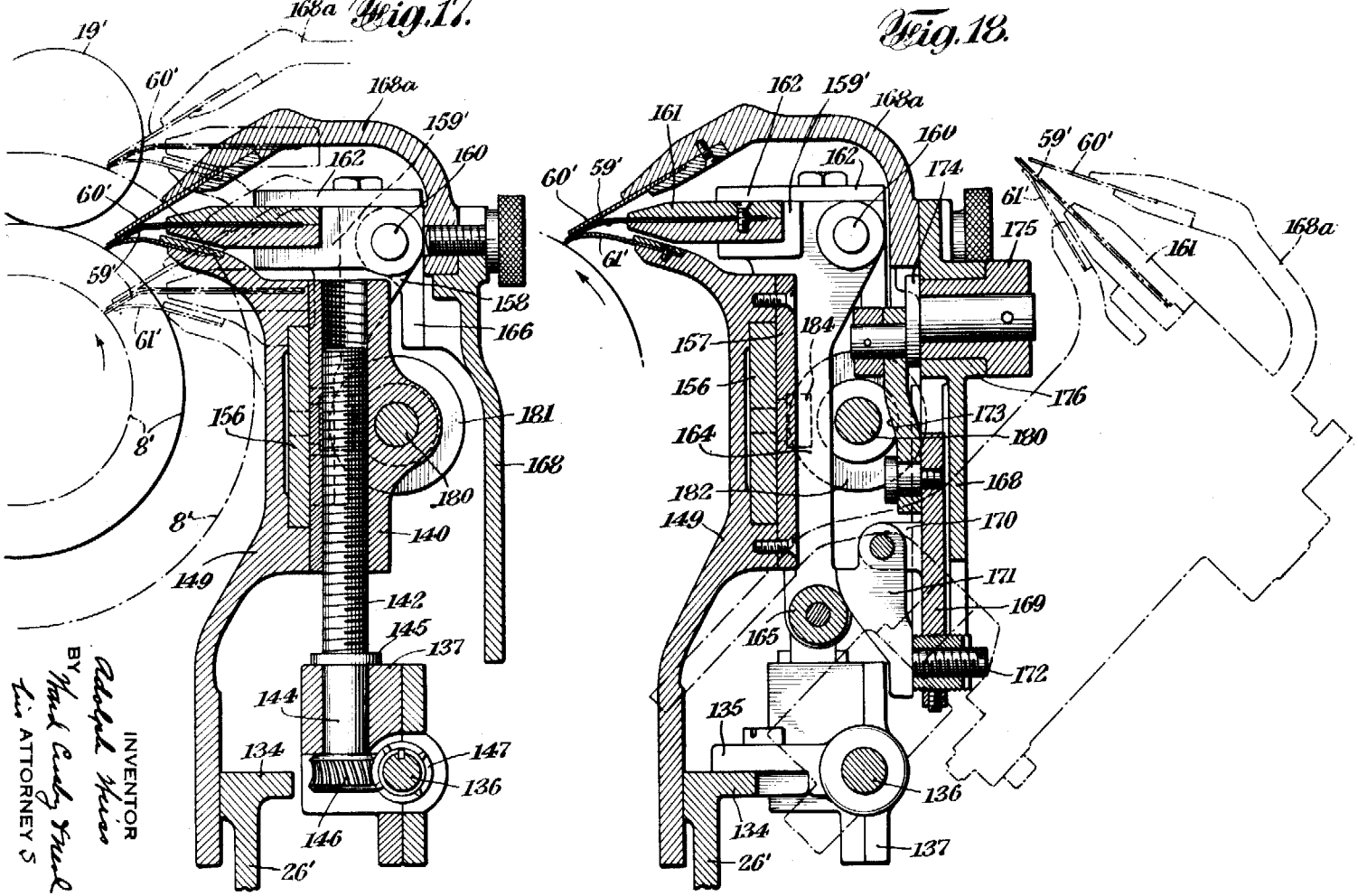
INVENTOR
Adolph Weiss
BY Wood Crosby & Neal
his ATTORNEYS

UNITED STATES PATENT OFFICE 21,212

ROTARY INTAGLIO PRINTING

Adolph Weiss, Brooklyn, N. Y.

Original No. 2,014,303, dated September 10, 1935, Serial No. 681,692, July 22, 1933. Application for reissue March 10, 1936, Serial No. 68,138

39 Claims. (Cl. 101—157)

This invention relates to printing and more particularly to rotary intaglio printing.

As to certain of its features the invention is an improvement over that of my prior patent Reissue No. 18,856, dated June 6, 1933, for Rotary intaglio printing machine (original No. 1,631,169, dated June 7, 1927); and the present invention is also an improvement over certain features forming the subject matter of my copending application Ser. No. 646,032, for Rotary intaglio printing, filed December 7, 1932.

An object of the present invention is to provide a greatly improved method of and apparatus for supplying ink to the printing surface and for controlling the circulation of ink so supplied.

Another object of the invention is to provide an improved wiping mechanism for removing the surplus ink from the printing surface; and which mechanism not only provides for greatly increased efficiency in wiping but other operating and maintenance advantages of great importance.

Another object of the invention is to provide means facilitating the use of printing rollers of varying diameters while maintaining the inking and wiping mechanism in proper adjusted relation thereto and at the same time permitting ready access for the removal of the cylinders of varying sizes and of the adjustment of the operating parts.

Further and more specific objects, features and advantages will more clearly appear from the detailed description given below taken in connection with the accompanying drawings which form a part of the specification.

Referring to the drawings:

Fig. 6 is a sectional view taken at 6—6 of Fig. 4 illustrating certain features of the mechanism for vertically adjusting the portion of one side wall of the ink housing;

Fig. 7 is a section taken at 7—7 of Fig. 4 illustrating certain details of mechanism for reciprocating the doctor;

Fig. 8 is a segmental perspective view showing certain features of the wiping mechanism including the doctor structure and associated parts;

Fig. 9 is a section at 9—9 of Fig. 4 showing certain details of mechanism for regulating the pressure of the doctor;

Fig. 10 is a sectional view at 10—10 of Fig. 4 showing certain details of mechanism for locking a part of the structure in position;

Fig. 13 is a partially diagrammatic view showing certain parts of the structure and illustrating the method of circulating and supplying ink to the printing cylinder;

Fig. 17 is a sectional view taken at 17—17 of Fig. 16 illustrating certain adjustment features of the modified wiping mechanism;

Fig. 18 is a sectional view taken at 18—18 of Fig. 16 showing further details and various positions of said wiping mechanism;

Fig. 19 (Sheet 7) is a partially diagrammatic view illustrating a modification of the ink circulating system;

Figure 1:
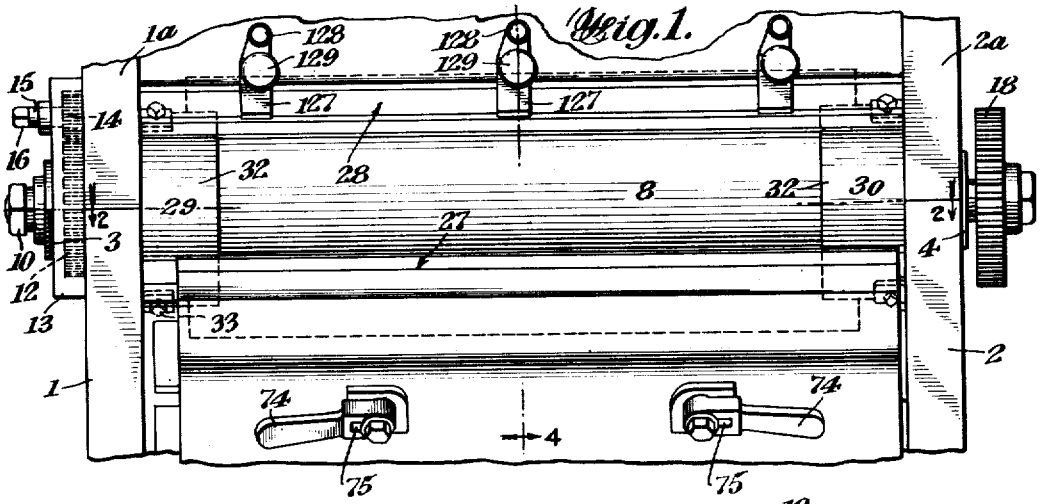
Fig. 1 is a plan view showing segments of the supporting structure for the cylinder and certain general features of an ink housing means therefor and related mechanism; the inking side of the cylinder being positioned at the upper side of the drawings and the wiping side at the lower side.

Before describing the invention in detail, it might be pointed out that in order not to unnecessarily lengthen the specification and increase the number of drawings, only such parts of the apparatus have been shown and described in detail as are necessary to clearly disclose and permit an adequate understanding of the invention by those skilled in the art, and other features of the machine will only be referred to and described in general. For example, the art of building a structural press framework for a rotary intaglio printing machine, such as is well known in the art, the means of mounting the feed supply rolls and other general features of this nature, are too well understood to warrant a detailed description of the same; it being understood that a comprehension of the details of the invention herein specifically illustrated and described will be sufficient to permit one skilled in the art to practice the invention. Furthermore, it is within the contemplation of the present invention that if desired it might be utilized in conjunction with certain features of the subject matter of my said copending application.

As an introduction to the detailed description to follow, a brief general description will now be given.

The invention contemplates the use of a highly volatile ink or printing fluid, and to that end there is provided a housing which together with the printing cylinder provides an enclosure which is adapted to prevent substantial evaporation of the volatile ingredients from the printing fluid. In producing the preferred form of such housing, it is desirable that certain parts going to make up the housing should perform other useful functions, and to this end it will be found that I have utilized numerous parts which serve other functions as component parts of said housing. In one embodiment of the invention, this housing comprises, as its end walls, portions of the side frames of the press structure which serve also as supporting means for the printing cylinder; while in an alternative embodiment, the end walls of the housing are formed separately from the said side frames. These alternative structures are deemed of importance in order to adapt the invention to be incorporated not only in a machine designed specifically therefor, but also permit its adaptation to already existing machines; and I have further found that in certain embodiments the invention may be preferable in one or the other of these embodiments.

In one embodiment of the invention I have disclosed provision for removing the printing cylinder from the wiping or doctor side of the mechanism, while in another embodiment I have disclosed means for removing the said cylinder from the opposite side: these alternative structures being of great utility in permitting the design of a machine to meet the requirements of floor space, arrangement of printing units and facility of removing and replacing cylinders to the greatest advantage depending upon the conditions met.

In one embodiment of the invention I have illustrated means for carrying the main supply of ink within the housing from where it is withdrawn and circulated to the ink applying station, the excess ink returning to the supply reservoir within the housing; while in another embodiment I have illustrated what might be termed a dry sump type, in which as fast as the excess ink from the cylinder is collected in the sump of the housing, it is withdrawn and returned to the supply reservoir means remote from the housing and which also serves to hold the main supply of ink, said ink being supplied from said reservoir to the ink applying station.

The invention further comprises as a chief feature of importance a novel means of flowing the ink on to the printing cylinder closely adjacent to but, in the direction of rotation of the printing cylinder, beyond the printing zone (i. e. that zone on the upper portion of the periphery of the printing cylinder at which position the design carried on the cylinder is printed on the paper web), and so positioning the printing cylinder and so circulating the ink that at no time is there an ink level in the housing into which the periphery of the cylinder dips or is immersed. The ink thus flowed on to the periphery of the cylinder at what wiill be termed the inking side (which has a peculiar significance in my invention) remains in contact with the cylinder in its rotation throughout the major portion of its periphery and is wiped off by a suitable scraping wiper or doctor closely adjacent to and, in the direction of rotation of said cylinder, in advance of said printing zone. The reasons for this radical departure from prior practice and the great benefits derived therefrom will be more fully discussed hereinafter.

The invention further contemplates a highly efficient and unique means of applying the ink in the manner heretofore described, wherein a maximum degree of uniformity in flow is provided in a ribbon-like stream extending throughout the length of the cylinder, so that at each and every point in a line extending parallel to the axis of the cylinder ink will be applied without any break in flow. Further, in conjunction with withdrawing the ink from the sump of the housing I have provided a means for effecting such withdrawal substantially uniformly throughout the length of the sump in a direction axially of the cylinder; thus preventing the collection at localized points or regions of ink pigments or any foreign matter which may be present. This is deemed of importance particularly in conjunction with t .e use of rapidly drying or highly volatile inks.

Features shown and described but not claimed herein are claimed in my said issued patent and copending application.

Figure 2:
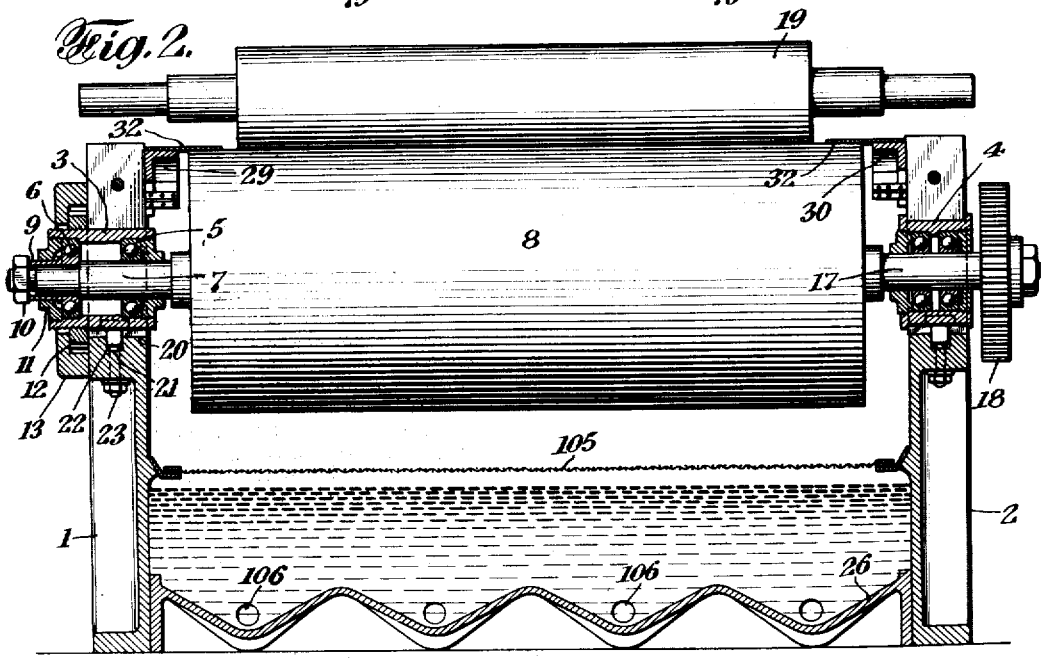
Fig. 2 is a sectional elevation taken through the axis of the printing cylinder at 2—2 of Fig. 1.

Referring to the drawings and more particularly to Figs. 1 and 2: 1 and 2 are side frames forming a part of the press supporting structure, and which are respectively provided with bearing housings 3 and 4 removably seated in the side frames. The housing 3 comprises ball bearings 5 and 6 seated therein, and into these extend an end 7 of an axis or shaft rigidly secured to a rotary intaglio printing cylinder 8. The shaft end 7 is reduced adjacent its outer end forming a shoulder engaging the inner face of the inner race of the ball bearing 6, and the said inner race is clamped thereagainst by means of a thrust sleeve 9 which is secured in position by suitable means such as the nut 10 engaging a threaded extremity of said shaft end.

The outer race of the ball bearing 6 is clamped against the housing 3 by means of a collar 11 interiorly threaded into the outer end of the housing 3. The outer end of said housing is also exteriorly threaded and said threads are engaged by cooperating threads formed interiorly on the adjusting gear 12, which is held against axial movement by means of a thrust housing 13 secured to the outer face of the side frame 1. The gear 12 is in driven mesh with the spur gear 14 positioned within the housing 13 and being secured to a stub shaft 15 suitably rotatably supported in the adjacent frame and housing and having an end 16 projecting beyond said housing and adapted to be engaged by a wrench or crank handle for rotation. It will be seen that such rotation of the shaft 15 will in turn cause the rotation of the gear 12, which being held against axial movement will cause axial movement of the casing 3 (the casing 3 being prevented from rotating by a suitable key—not shown) to thereby effect the axial adjustment of the printing cylinder 8 between the frames 1 and 2. The opposite end of the cylinder is provided with a shaft end 17 which extends through suitable roller bearings rigidly held in operative position within the bearing casing 4 by suitable means, and the shaft projects outwardly beyond its bearing support and the outer face of the frame 2 and carries secured to the outwardly projecting end a driving gear 18 which is connected to a suitable power train (not shown) for rotating the rotary intaglio cylinder. A pressure roller 19 is suitably supported from the press structure for cooperative engagement with the upper portion of the periphery of the cylinder 8 in a manner well understood in the art.

Figure 3:
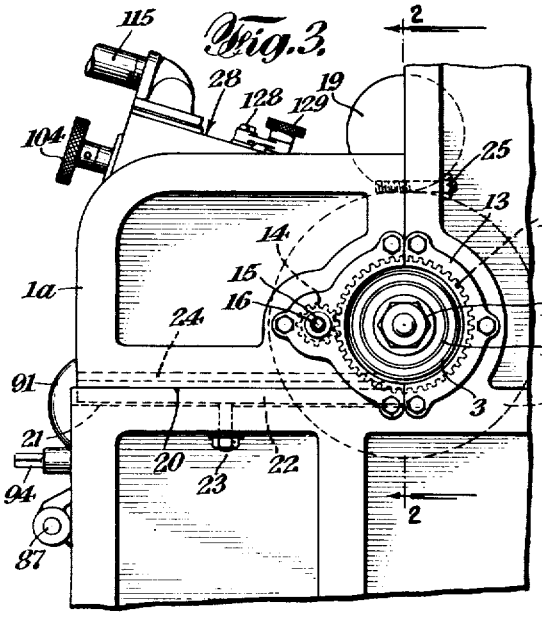
Fig. 3 is an end elevation of the left hand side of the mechanism shown in Fig. 1, with the inking side of the cylinder indicated at the left of the figure.

Provision will now be described for facilitating the ready removal of the printing cylinder 8 together with its integrally formed drive and supporting shaft and the bearing means associated therewith in assembled relation. Referring to Figs. 1, 2 and 3: it will be seen that the side frames 1 and 2 are provided respectively with movable segments 1*a* and 2*a* which each (Fig. 3) join the main portion of the frame along a vertical line extending through the axis of the cylinder 8 and along a horizontal line positioned somewhat below the lower periphery of the bearing housing, such as 3; this line being designated in Fig. 3 as 20. The frame segment 1*a* is constructed and adapted to function in the following manner, referring to Figs. 2 and 3. A slot, such as 21, is formed in each of the frames and extends somewhat below the line 20, and seated in this slot is the lower stem of a T bar 22 which carries secured thereto a stud 23 extending downwardly through a web in the said frame and being provided with a nut on its outwardly extending portion. The upper legs of the T bar are horizontally slidably seated in a cooperating T recess 24 formed in the lower portion of the frame segment such as 1*a*. It will therefore be seen that the frame segment 1*a* in normal position may be clamped rigidly downwardly by tensioning the stud 23 and that the part may be released for removal by unscrewing the nut on the stud 23. The frame segment 1*a* is rigidly clamped against the main frame portion along its vertical juncture by means of a suitable stub and nut 25. In order to permit the ready removal of the parts as indicated, the housing 13 is divided into two parts along a line extending vertically through the axis of the cylinder 8. It is also pointed out that the T bar 22 is so positioned that its top face is slightly above the lowermost point of the bearing housing 3 and has its inner end contiguous to said housing formed on the arc of a circle coinciding with the outer periphery of the casing 3, thereby providing means for holding the cylinder and assembled parts in normal position while the frame segments 1*a* and 2*a* and cooperating parts are being removed, whereupon the cylinder and assembled parts may be removed with ease. It will be understood, of course, from the foregoing that a similar structure is provided and similar adjustments and removals of the parts may be made with respect to the frame segment 2*a* on the opposite side of the machine, which being in large measure identical with those just referred to will not be described in detail.

*Ink housing*

Figure 4:
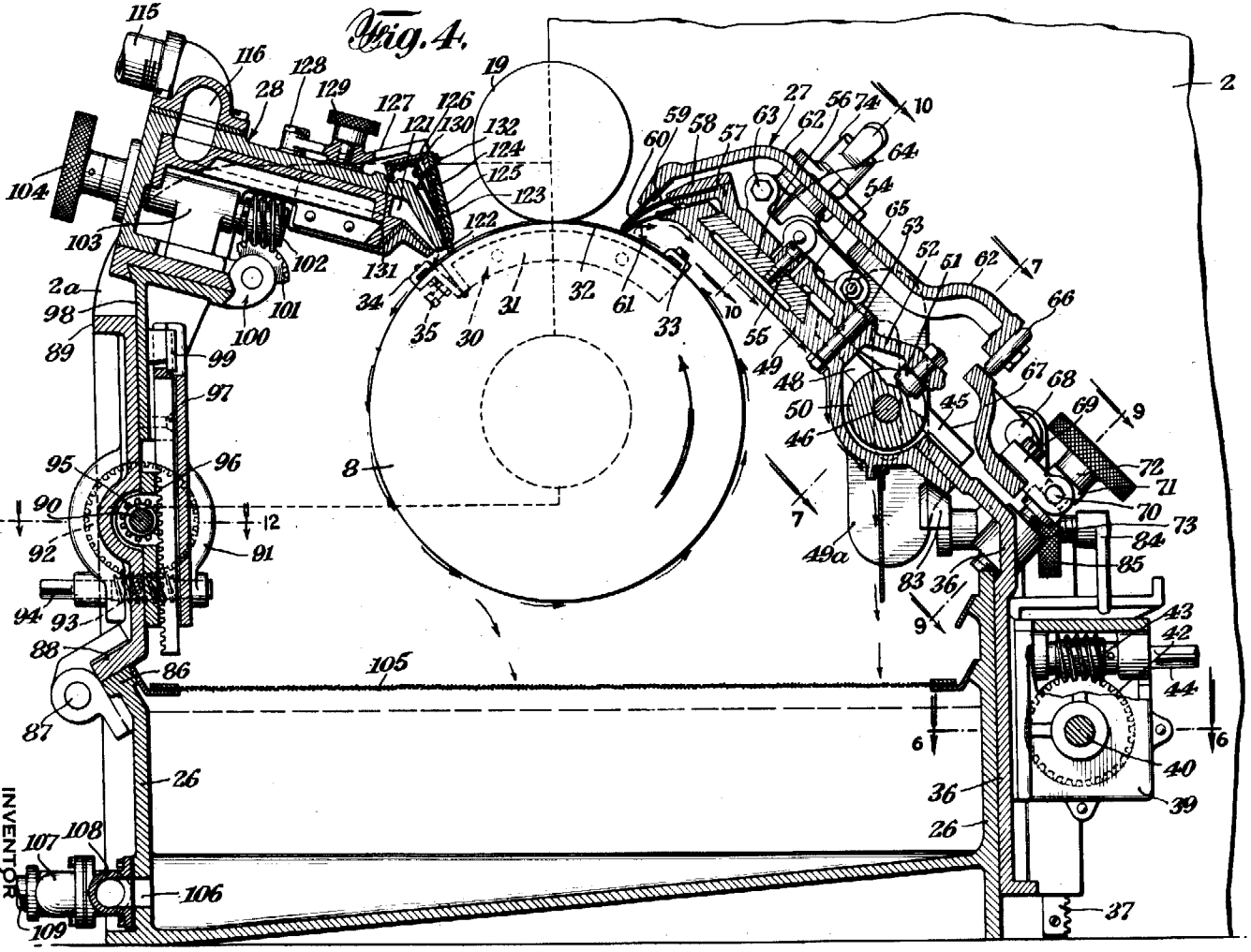
Fig. 4 is a sectional elevation taken transversely of the axis of the cylinder approximately at 4—4 of Fig. 1.

Referring to Figs. 2 and 4: There is positioned between the frames 1 and 2 a member 26 in the form of and providing a bottom or sump for the housing, and which is suitably attached to the said frames in sealed engagement therewith. The sides of the sump or bottom portion 26 extend upwardly as indicated in Fig. 4. It will therefore be seen that the receptacle portion 26 forms in conjunction with portions of the frames 1 and 2 the major body of the ink housing, and in this connection it is pointed out that the bearings for the cylinder ends are in sealed engagement with their respective carrying frames and with the respectively cooperating ends of the shafts of the cylinder 8. The main body portion of the housing is provided with upwardly extending side walls in sealed continuity therewith and (Fig. 1) adjacent the upper portion of said side walls is mounted on one side the wiping mechanism, which will be designated in its entirety for the present purpose as 27, and at the other side the ink applying head, which will be designated in its entirety for the present purpose as 28; these two means serving the additional function of carrying the seal from the respective side walls to the periphery of the cylinder on respective sides thereof, and being positioned in a direction toward each other closely adjacent to the printing zone; and a seal being also effected between said means and cooperating wall portions of the housing body with the frame members 1 and 2. This only leaves to be sealed or enclosed the spaces between the respective ends of the cylinder and adjacent inner faces of the side frames 1 and 2. This is accomplished by means of end sealers designated in their entirety as 29 and 30. Each of these members comprises (Figs. 2 and 4) an arcuate rigid bracket or supporting member such as 31 and a thin flexible member 32 resting on and supported on the upper flange 31 with one end clamped rigidly against said supporting member by means of the clamping plate and screw 33 with the opposite end clamped in an adjustable bracket 34 which is pivoted to the bracket 31 and adjustable relative thereto by means of the set screw 35; whereby the resilient strip 32 may be pulled out over the rigid member and thus be made to conform to the arcuate shape thereof. This flexible member 32 (Figs. 1 and 2) extends inwardly and over the end of said cylinder on the upper surface thereof and in sealing engagement therewith; it being understood that the underlying peripheral ends of the cylinder underneath these strips are without the portion of the cylinder which carries the design to be printed. A positive and efficient seal is thereby effected between the inner faces of the respective end walls of the housing and the surface of the printing cylinder in the region lying between the wiping and ink applying means heretofore referred to. This also prevents splashing of ink from the ends of the printing cylinder when the printing cylinder is rotated at high speed. As will be seen (Fig. 2) the brackets 29—30 are spaced axially from the respective ends of the cylinder 8 to provide clearance for the maximum axial adjustment of the printing cylinder 8. On the doctor side of the cylinder the wiping mechanism 27 overlies these flexible sealing strips, and likewise on the ink applying side of the cylinder provision is made by the means 28 for overlying and sealing with these flexible strips; the extreme thinness of these flexible strips permitting the last said members which thus seal with them of also sealing with the surface of the cylinder. From the foregoing it will be readily understood how the ink housing means cooperates with the printing cylinder to provide an enclosure for preventing any substantial evaporation from the ink of the volatile ingredients thereof, while at the same time permitting a portion of the periphery of the printing cylinder to be positioned within the said enclosure for the application of ink to said cylinder.

*Wiping mechanism and supporting housing structure*

Figure 5:
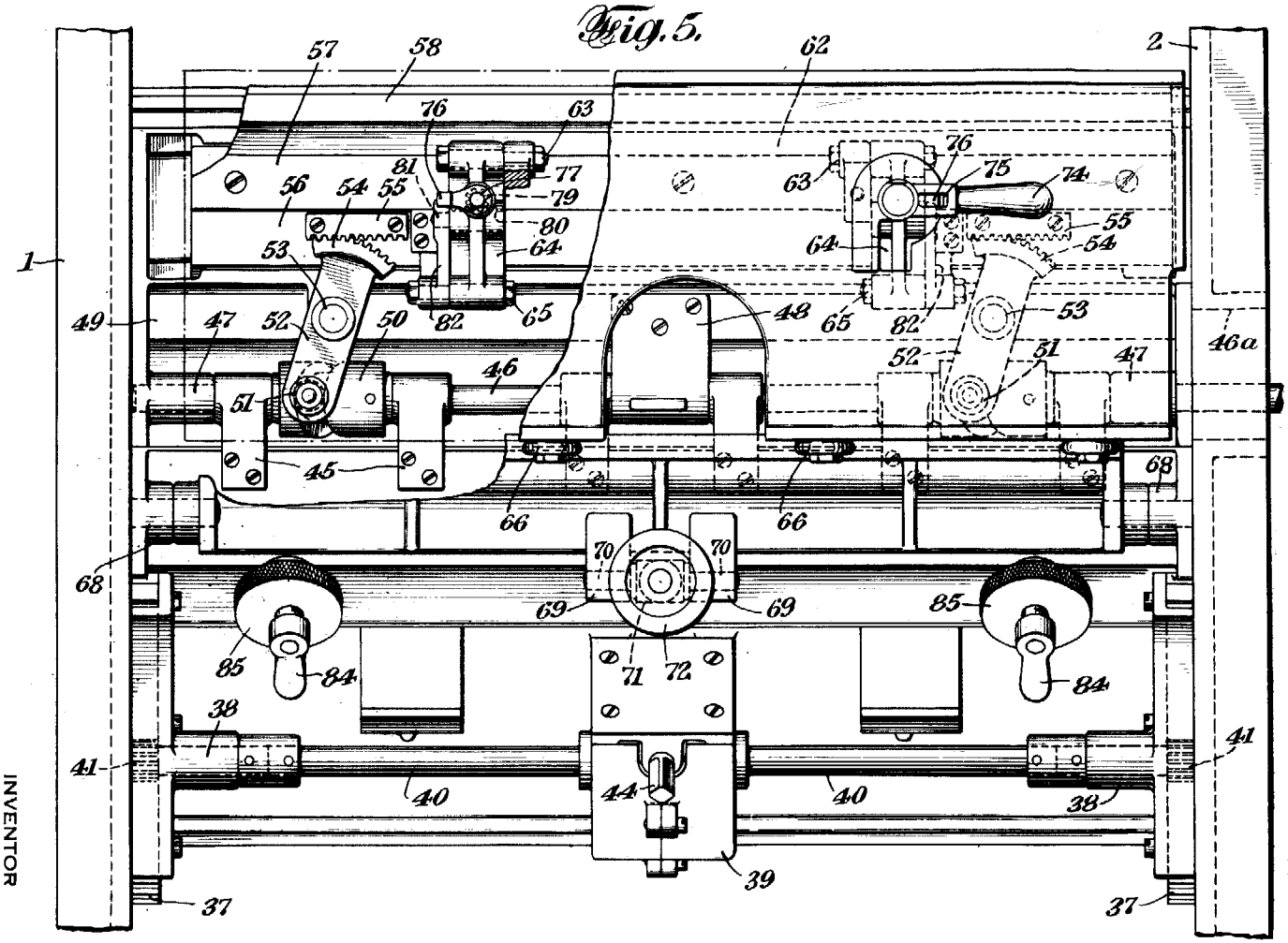
Fig. 5 is a side elevation of the mechanism shown in Fig. 4 looking towards the right hand side of Fig. 4 and having certain parts broken away to more clearly show certain features of the mechanism.

Referring more particularly to Figs. 4, 5 and 7: An adjustable side wall 36 is vertically slidably mounted adjacent to and in sealing engagement with the side wall of the housing bottom 26 and is held in such position by suitable means, such as the gear racks 37 which are rigidly attached to respectively adjacent side frames 1 and 2. The vertically adjustable wall portion 36 carries journal housings 38 positioned adjacent respective frame members 1 and 2 and a central journal housing 39; said housing serving to support a shaft 40 carrying at respectively opposite ends spur gears 41 in mesh with racks 37, and at its median portion said shaft 40 carries a worm gear 42 in mesh with a worm 43 secured to and adapted to be operated by its shaft 44, the outer end of which is formed for engaging the same with a wrench or crank handle, and the rotation of which serves as a means of moving the side wall portion 36 in an upward and downward direction through the gear train previously described.

Figure 11:
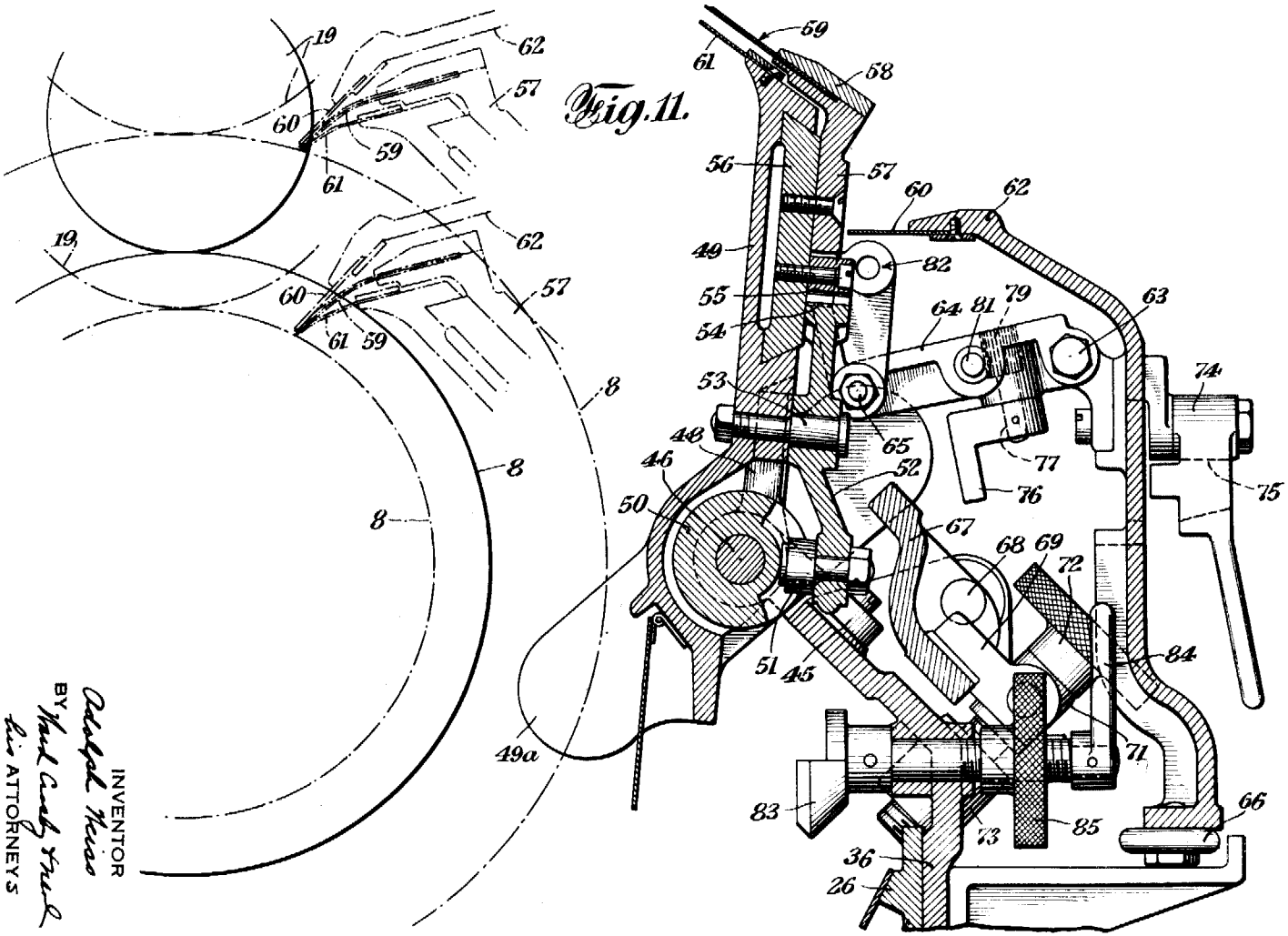
Fig. 11 is a sectional view taken transverse to the axis of the printing cylinder of Fig. 4 showing the adjustability and various positions of the wiping mechanism and related parts.

Adjacent the upper edge of the wall portion 36, which as will be seen is inclined inwardly, are carried a plurality of hinge brackets 45, spaced apart and positioned as will be more clearly seen with reference to Figs. 5 and 11. These hinge brackets serve to support the shaft 46 which serves the dual function of a hinge pin and as a drive shaft in the mechanism for reciprocating the doctor, one end extending through frame 2 to drive means (not shown). The shaft 46 is engaged adjacent its respective ends by hinge journals 47, and intermediate its ends by a hinge bracket 48, which are carried by an upwardly and inwardly extending wall portion or bracket 49, which bracket as will be seen is provided with a recess to accommodate a pair of barrel cams such as 50 which are pinned to the drive shaft 46 and adapted to be rotated thereby. These barrel cams are engaged respectively by cam rollers such as 51 carried on the lower end of cam arms such as 52 pivotally mounted as at 53, and having formed on their upper ends gear segments such as 54 in driving mesh with gear racks such as 55 rigidly secured to a longitudinally slidable member 56 (see also Fig. 11), which is provided with bevel edges in the form of a dovetail which is seated in a cooperating groove formed in the bracket 49. Also rigidly attached to the slide 56 is a doctor holding bracket 57 having an inwardly extending flange between the upper face of which and a cooperating clamping bar 58 a doctor blade is adapted to be held (see also Fig. 8). The doctor blade is designated as 59. The doctor blade comprises two laminations of thin flexible metal designated respectively as 59*a* and 59*b*, each lamination supplementing the other to produce the unitary function of the doctor in the present preferred embodiment of the invention. The lamination 59*a* is positioned on the bottom and extending outwardly beyond the lamination 59*b* for approximately ⅛'', thereby providing the wiping edge per se. This lower lamination 59*a* is made of extremely thin material, i. e. in the present preferred embodiment which I have found in actual practice to give most satisfactory and efficient results 0.004'' in thickness. The chief function of the upper lamination is to reinforce and supplement the lower lamination throughout the major portion of the body thereof, which construction permits the use of the wiping edge of extremely thin thickness; this extremely thin edge in turn providing a means of most efficiently and effectively wiping the printing surface without marring, scratching or unduly wearing the same, and also provides an efficient means of sealing against the surface of the cylinder between the two end sealers 32 (Fig. 1). The thickness of the respective laminations 59*a* and 59*b* is thinner than is practical in the usual operation and this is made possible by the unique manner in which the unitary doctor is mounted, which will be more particularly pointed out following.

In its normal inoperative position the outer edge of the doctor is rigidly clamped in fixed position between the head 57 and the clamping strip 58, no pivotal means of adjusting the doctor into engagement with the printing cylinder being provided as a usual practice. The freely overhanging inner edge of the doctor 59 is adapted to be flexed downwardly by means of the doctor pressure blade 60 and (by means to be pointed out following) upon being so flexed downwardly the under surface of the doctor engages with the flexible sealing strip 61, whose outer edge is rigidly clamped on the upper edge of the bracket 49; the inner edge of the flexible seal 61 engaging the doctor somewhat to the rear of its operative wiping edge. The sealing strip 61, in addition to serving as a lower resilient support and stiffening member for the doctor, serves to carry the seal from the doctor to the bracket 49 and thence downwardly to the main body of the housing. It will be noted that this manner of mounting the doctor serves to form the free overhanging portion of the doctor into an arched surface supported closely adjacent to its wiping edge between the members 60 and 61 and permitting the extremely thin flexible edge of the doctor to engage the surface in a direction approximately extending in the radial direction of the cylinder, or in what might be termed a concave wiping position, when viewed in the direction of rotation of the printing surface toward the doctor; instead of the usual wiping position of the doctor where the wiping edge is directed more nearly tangential than radial, or in what might be termed a convex wiping position, when similarly viewed. At this point it is also well to note that the upper member 60 engaging and deflecting the doctor downwardly against the member 61 is reciprocable with the doctor relative to the stationarily held sealing member 61.

The member 60 is mounted and supported on the upper edge of the pressure apron 62 which also serves the dual purpose of a cover for the mechanism located underneath the same. The member 62 is pivotally supported at 63 (see also Fig. 11) to a pivot link 64 whose lower end is pivotally supported as at 65 from the slide block 56. The lower end of the pressure apron 62 carries a plurality of rollers 66 which in normal operation are adapted to roll on a track formed on an adjustable bracket 67, which is pivotally supported at 68 on the upper edge of the side wall portion 36. The adjusting bracket 67 has secured to its lower end a bifurcated bracket 69 (see also Fig. 9) and each of its bifurcations is provided with a T pin 70 whose stem is pivotally journaled in such bifurcation and whose head is slidably engaged by a collar 71 which is axially held by an adjusting screw 72 whose lower end is in threaded engagement with a boss 73 formed integral with the wall portion 36. From the foregoing it will be seen that in order to adjust the operative pressure of the wiping blade against the cylinder, and with the parts positioned as shown in Fig. 4, the knurled head of the screw 72 is rotated thereby moving the lower end of the adjusting bracket 67, varying the position of the track portion of the upper end thereof, which through the roller 66 serves to adjust the pressure apron 62 about its pivot point 63, to thereby suitably adjust the position of the doctor pressure blade 60 and thereby the pressure exerted by the doctor upon the cylinder.

When it is desired to gain access to the doctor, either with the bracket portion 49 in the position shown in Fig. 4 or in Fig. 11, the pressure apron 62 (Fig. 11) may be swung downwardly about the combined pivot points 63 and 65. The means for locking and unlocking the pressure apron 62, in order to permit the movement just described, comprises (Figs. 10 and 11) a handle 74 which is pivotally supported on the member 62 and which is provided with an opening 75 in which extends a crank arm 76 pivoted to a stub shaft 77 journaled in a boss 78 formed integral with the pivot link 64. The shaft 77 has integrally formed on the lower end thereof a gear 79 in mesh with a rack 80 formed integral with a locking bolt 81 slidably supported in said boss 78 for movement transverse the axis of the shaft 77, and the bolt 81 is adapted to be inserted in a cooperating hole formed in the bolt bracket 82 which is rigidly attached to the slide bar 56. Accordingly, with the parts as shown in Figs. 4 and 10 by rotating the pair of handles 74, the crank arm 76 transmits this motion to the mechanism previously described to withdraw the bolt 81 from its cooperating latch 82, and by still holding the handles the bracket cover 62 may be pulled outwardly and allowed to move downwardly into the position indicated in Fig. 11, during which time the crank arm 76 will of course withdraw from the recess 75 and the slot formed in the cover 62 in register therewith. Similarly, when the cover is moved back into the closed position, the turning of the handles serves to lock the cover in closed position and place the previously determined pressure on the doctor. It will therefore be seen that the mechanism just described fulfills the following functions: It serves to maintain and provide for the correct adjusted pressure on the doctor at all times during the reciprocation thereof, the screw 72 providing for operative adjustment of this pressure, and the latch handle 74 and associated mechanism serving to entirely release the doctor from operative wiping position and also permitting the removal of the cover 62 to provide ready access to the parts positioned therebeneath—the cover normally serving the dual purpose of a bracket and adequate protection of the working parts. It will be understood that this movement just described has been with reference to the wall bracket 49 being positioned as indicated in Fig. 4 and is in no way concerned with the pivotal movement of the bracket 49, which will now be described.

In this embodiment of the invention the cylinder is adapted to be removed from the inking side of the housing, but at the same time it is desirable to swing the wall bracket 49 outwardly in order to remove it from close proximity to the cylinder for the purpose of having access thereto in this region. For this purpose, the wall bracket 49, as has been previously described, pivots about the shaft 46, which also being the drive shaft for the doctor reciprocation permits the drive train of the doctor to remain undisturbed at all times. This is a feature of great usefulness since it obviates the necessity of adjusting the driving train of the doctor each time the doctor is removed or swung away from the cylinder. In its normal operative position as indicated in Fig. 4 the wall bracket 49 is locked securely in position by means of cam quadrant 83 which engages the lower extension of the said bracket and clamps it firmly against the upper marginal edge of the wall portion 36 so as also to provide a sealed contact therebetween. The cam lock 83 is carried by a shaft rotatably mounted in a boss formed integral with the wall portion 36, and on its outwardly projecting end is fastened a handle 84 to provide means for rotating the said cam. In order to lock the cam in this position, the shank of the cam stem is threaded and is engaged by a knurled locking nut 85. There are preferably two of these locking mechanisms, one adjacent each end of the housing, as illustrated in Fig. 5. When it is desired to swing the bracket 49 and doctor operating mechanism carried thereby outwardly, the latch handles 74 are released, the knurled nut 85 is moved outwardly to release the cam stem, the handle 84 is moved to rotate the cam segment 83 and thereby release it from engagement with the lower extension of the wall bracket 49 and by grasping the two handles 74 and pulling them outwardly and downwardly the cover 62 is moved outwardly and downwardly and through the means of interconnecting hinge link 64 the wall bracket 49 may be swung outwardly as indicated in Fig. 11. If desired the bracket 49 with the pressure apron 62 in the relative position of Fig. 4 may be swung open to a limited extent in assembled relation.

Where the shaft 46 (Fig. 5) passes through the frame 2 a vertical slot 46*a* is provided to accommodate vertical movement of the shaft during adjustment of the wall bracket 49, and in order to keep this slot closed a dependent flange (Figs. 4 and 5) 49*a* is provided and formed integral with bracket 49. Referring to the left hand portion of Fig. 11: The dotted positions of the doctor and cooperating blades are shown to illustrate the vertical adjustment for adapting the mechanism to the use of printing cylinders of various sizes; this vertical adjustment being effected by the vertical adjustment of the wall portion 36 (Fig. 4) in the manner previously described.

*Inking head and supporting housing structure therefor*

Figure 12:
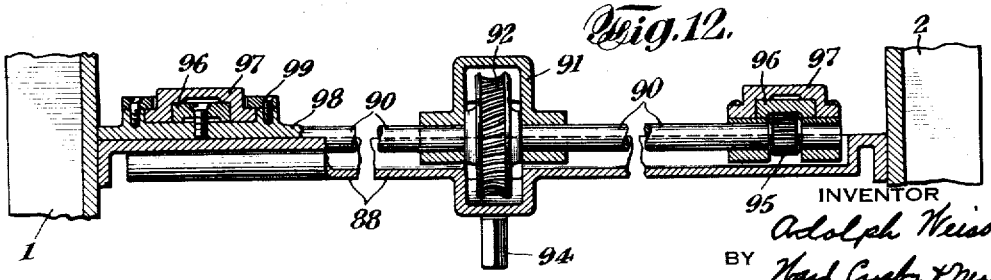
Fig. 12 (Sheet 1) is a sectional view taken at 12—12 of Fig. 4 illustrating mechanism for adjusting a portion of the side wall of the housing at the inking side of the mechanism.

Referring to Fig. 4: The left hand side wall of the housing bottom 26 carries secured to the upper portion 86 thereof one side of a suitable hinge mechanism 87, the other side of which is secured to an upwardly extending housing side wall portion 88. This side wall portion extends upwardly to a reinforcing flange 89 and when in its normal operative position its lower end is in sealed engagement with the marginal edge 86 of the bottom portion 26. The wall portion 88 (Fig. 12—Sheet 1) also is in sealed engagement at its ends respectively with side frames 1 and 2. The wall portion is provided with an offset portion providing an inner recess for the reception of a shaft 90 suitably journaled at its ends in portions rigidly secured to the housing portion 88 and also supported at its central points in journals formed in the cover 91 which cover is secured to the housing portion 88. At its central point and positioned within said cover, the shaft 90 carries secured thereto a worm gear 92 which is in driven engagement with a cooperating worm 93 mounted on the shaft journaled in bearings in the cover 91 and having an outwardly extending end 94 adapted to be engaged by a crank handle for rotating the worm and worm wheel and shaft 90. The shaft 90 carries adjacent its journal ends a spur gear such as 95 each of which is in driving engagement with a gear rack 96. The gear racks 96 are slidably positioned within covers 97 serving to restrict the racks to a vertical movement, the covers being rigidly attached to the housing portion 88. The racks are rigidly secured at their respective upper ends to a housing upper wall portion 98, which also carries secured thereto guide plates 99 which engage flanges on the rack cover 97, thereby permitting a vertical sliding movement of the wall portion 98, the gear racks 96 and the guides 99 relative to the stationary cover 97. From the foregoing it will be understood that upon rotating the shaft 94 vertical adjustment is provided for the wall portion 98. The upper portion of the wall portion 98 provides a shelf or bracket for supporting the inking head 28. This bracket is provided with a dovetail which is engaged by a dovetail groove in the lower frame of the inking head, the outer wall of the said groove being rigid and the inner wall of the groove being formed by a plurality of locking members 100 which are secured to a common shaft supported on the inking head structure and adapted to be rotated with respect thereto. A worm gear quadrant 101 is carried by and secured to the said shaft and is in mesh with cooperating form 102 which is carried by a shaft journaled in the bearing portion 103 rigidly secured to the inking head structure, and the shaft extends outwardly and carries on its outwardly projecting end a knurled wheel 104. This means provides ready removal of the entire inking head, for purposes of this assembly or necessary servicing. Further details of construction of the inking head 28 will be more particularly described following in conjunction with the inking system. It will be understood that the wall portion 98 and the inking head 28 provide a sealed continuity extending upwardly from the wall portion 88 and housing bottom 26; also that the side edges of the wall portion 98 and head 28 are adapted for sealed engagement respectively with the side frames 1 and 2, when the parts are in operative position. It will also be understood that when it in desired to have complete access to the printing roller, as for example when it is desired to be removed, the intermediate wall portion 88, the upper wall portion 98 and the head 28 may be swung outwardly as a unit about the pivotal point of the hinge 87, so that the parts assume such position as to give free access for the removal and replacement of the printing cylinder. Suitable means (not shown) is provided for moving and supporting these portions of the housing while being swung outwardly and lifted inwardly to assume their closed position; and suitable means (not shown) is also provided for locking the parts in their closed operative position.

*Inking system*

In the embodiment illustrated in Fig. 4, the housing bottom 26 is constructed so as to provide a self-contained reservoir for the ink whose normal operating level is indicated therein. The ink is withdrawn from this reservoir and circulated up to the inking head 28 in the manner to be presently described. In order to provide against any possibility of the ink in the reservoir being contaminated with lint particles, etc., I have provided a removable screen 105 (Figs. 2 and 4) which is provided with a relatively rigid frame adapted to rest on suitably formed portions of the housing so as to support the screen at a point above the ink level and spaced downwardly from the lowermost point of the largest cylinder to be utilized. The ink reservoir is provided with a sump which is divided axially of the cylinder in a plurality of transversely extending valleys, each of which is inclined downwardly on one side of the sump to the opposite side, and adjacent the lowermost point of these valleys they are provided with outlet openings or ports such as 106 which are in communication with a common manifold 107 (Figs. 4 and 13), being interconnected therewith from a plurality of divisional manifolds 108, each of which communicates with a plurality of said outlet ports; whereby the flow of ink from the sump is assured being uniformly distributed axially of the printing cylinder, which feature I have found to be highly desirable in practical operation and to be highly beneficial, with improved results. The header 107 is in communication with a main conduit 109 which (Fig. 13) passes through a suitable valve 110 having one opening 111, to provide for introducing new fluid into the system when desired, and with another opening in communication with a circulating pump 112, which is also in communication with a suitable valve 113 having one opening 114 for the purpose of draining the system when desired and another opening connected through a main conduit 115 to the inking head, which serves as a fluid distributing means.

This manner of ink removal from the sump at a plurality of points spaced apart axially of the cylinder has been found of particular importance in machines employing relatively long cylinders, and in which therefore the housings are relatively long; and this feature has been found to present a material improvement in the operation of the apparatus. For example, in a machine having a printing roller say of 72" length a housing with a single outlet, such as has been always employed heretofore in ink fountains, only the fluid in the vicinity of the outlet port will be actively moved to discharge; and accordingly the body of fluid more remote will be sluggish, and stagnation will result, bringing about undesirable localization of ink or such foreign matter as may be present. It will be understood that ink comprises as its constituents ingredients or elements of varying specific gravity; and therefore such localization will result in separation and/or stratification of these constituents of differing specific gravities, which result is detrimental to efficient operation and highly undesirable. With the multiple outlet withdrawal herein provided, this difficulty is overcome and uniform flow of the ink along the entire length of the housing has been achieved.

The inking head is provided with a main arterial inlet in communication with the main conduit 115 and the said inlet branches outwardly to the right and left into a plurality of secondary passages, each of which is in communication with further divisional branches as clearly illustrated in Fig. 13, i. e. one of the secondary passages such as 116 is in communication with successive branches such as 117, each of which again branches outwardly into a plurality of branches such as 118, each of which branches outwardly into a plurality of branches such as 119, each of which again in turn branches outwardly into a plurality of final branches such as 120, the last of said branches terminating in a series of passages arranged in a direction axially of the printing cylinder and lying closely adjacent to each other; said passages being in communication along said line with a header or equalizer chamber (Fig. 4) 121 which serves to bring the fluid into a homogeneous body possessing uniformity of movement throughout its length in an extent substantially coincident with the extent of the design on the printing surface of the cylinder axially thereof. The chamber 121 is provided with an outlet orifice 122 in the form of a long narrow slot lying, in normal operative condition, closely adjacent to the surface of the printing cylinder; thereby providing a ribbon-like stream extending in a continuous line axially of the printing surface and having a uniform rate of flow throughout its length. It will be noted that the successively subdividing passages and the chamber 121 formed in the inking head 28 lie in general in the same plane which is inclined substantially downwardly. This provision, in addition to providing for complete drainage of the inking head, provides for depositing the ink on the printing surface by gravity.

In order to effect an efficient seal between the nozzle end of the inking head and the cylinder 8 I provide a felt or other suitable sealing strip 123 which is provided at its upper edge with a U shaped metal clamp 124 in which the upper edge of the strip is rigidly fastened. This metal strip is attached to a carrying plate 125 by means of machine screws preferably passing through slots in the plate 125 and in threaded engagement with the U strip 124 to provide for adjustment of the sealing strip. The plate 125 is rigidly secured to the inverted U channel 126, the outer leg of which rests in a longitudinal groove formed in the top of the ink housing 28 and the upper face of the channel adjacent its inner edge is engaged by arms 127 loosely supported from the inking head 28 as at 128, and these arms are permitted a certain vertical movement by means of the adjusting nuts 129 (see also Figs. 1 and 13). An inverted L angle member 130 is positioned within the inverted U channel 126 and is pivotally attached thereto as at 131. This channel angle member carries a flexible strip 132 which extends downwardly behind the sealing strip 123 and between the same and the upper face of the inking nozzle. It will therefore be seen that suitable adjustment is provided for positioning and clamping the felt strip so that it effects an efficient seal between the inner end of the inking head 28 and the surface of the cylinder; it being noted that the strip also is adapted to engage the inner faces of the side walls 1 and 2 on its respective ends. It is further particularly pointed out that the positioning of the edge of the felt strip which contacts the printing surface in such close proximity to the nozzle orifice serves to maintain the sealing edge of the felt strip lubricated by the printing fluid at all times, thereby preventing injurious scratching of the printing surface while at the same time maintaining a main effective seal.

As has been previously pointed out, and as will now be clearly understood from the foregoing, and with particular reference to Fig. 4, the relative positions of the inking head and the doctor are such that the ink remains in contact with the cylinder throughout an extensive portion of the periphery of the cylinder, and the importance of this feature should be clearly understood. In intaglio printing there is a tendency for the ink remaining in the engraved or etched (undercut) portions of the printing surface, after the impression has been delivered from the printing surface to the web, to solidify or harden in these cavities, to the extent of a small increased increment or film after each impression. This tendency of course is greatly increased in degree according to the increased volatility of the ink. In order to entirely eliminate this condition, which would bring about deleterious results by decreasing the sharpness of the prints produced, I have provided a means of dissolving any film which might tend to form in these engravings or cavities by keeping a fresh flow of ink applied to the cylinder during the major portion of its circumferential travel. To this end it will be noted that (Fig. 4) the ink is applied beyond the printing zone, in the direction of rotation of the cylinder, in what might be termed the first quadrant and the doctor is positioned around the opposite side of the cylinder in advance of the printing zone in what might be termed the fourth quadrant. In these respective relative positions it is preferable that the inking head and the doctor lie in close proximity to the printing zone, since according to the features of the present invention the more proximate to the printing zone, the longer will be the path of travel during which the printing surface is subjected to the fresh supply of ink, and correspondingly the greater will be the portion of the printing cylinder enclosed within the housing.

*Modified doctor mounting and supporting housing structure*

Referring to Figs. 14 to 18, inclusive: A modified structure is illustrated, wherein provision is made for removing the printing cylinder from the doctor side of the apparatus. Only such features of the structure as depart from the embodiment previously described will be referred to in detail and parts of the mechanism associated therewith are understood to be similar to the structure previously described. For example, in the modification now to be described the full showing of the bottom housing portion 26 (Fig. 4) has been omitted and it will be understood that a similar portion is employed in the modified structure only differing therefrom in such respects as will be understood by those skilled in the art to be necessary to adapt it for use with the modified details to be described; also the left hand portion of the mechanism as shown in Fig. 4 will be identical in the modified structure except that since the modification contemplates the removal of the cylinder from the doctor side of the mechanism the hinged connection 87 may be omitted and the portion 86 may be made rigid with and as a continuation of the portion 88. It is of course obvious that the hinged connection such as 87 may be utilized in conjunction with the modification and in that event provision will be made for removing the printing cylinder from either the doctor side or the inking side.

Figure 14:
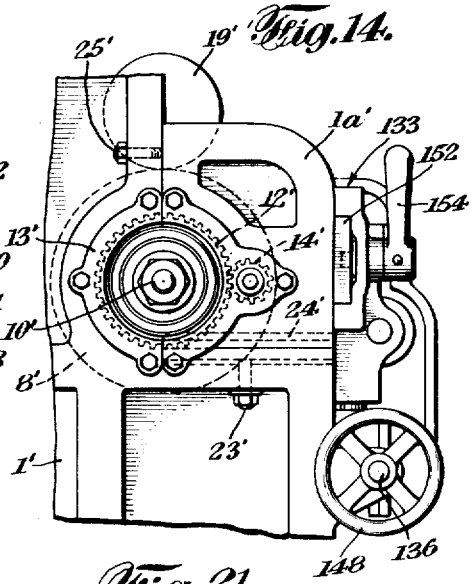
Fig. 14 (Sheet 2) is an end elevation of a modified structure adapted to permit the removal of the printing cylinder from the doctor or wiping side of the mechanism, and corresponds in general to Fig. 3.

Referring more particularly to Fig. 14: The means of supporting the cylinder from the frame structure and the provision for ready removal by providing the side frames with removable portions is similar in all respects to that described in detail in connection with Fig. 3 and accordingly the detailed structure and cooperated relationship of such parts will not be again repeated, but the corresponding parts of Fig. 14 will bear similar reference characters to the corresponding parts of Fig. 3 with the prime suffix (′) added. The hinged housing structure and doctor mechanism supported thereby will be designated in general as 133, and further details of this structure will now be described with reference to Figs. 15 to 18, inclusive.

The bottom housing portion (Figs. 17 and 18) is designated as 26′ and is provided with an outwardly extending flange portion 134 which has rigidly secured thereto suitable bracket collar means 135 through which passes a shaft 136 supported adjacent its oppositely extending ends from the side frames 1′ and 2′. This shaft carries hinge bracket means 137—138 mounted for rotation thereabout and held in axial position by the said collar means 135, and each of said hinge brackets carries upwardly extending guide bars such as 139 (Figs. 15 and 16) rigidly secured thereto, and said guide bars are slidably engaged by a pair of blocks or guide brackets 140—141 positioned adjacent the inner faces of the respective side frames 1′ and 2′. These blocks are held in adjusted vertical position by means of jack screws 142—143 (Fig. 17), each of which is provided with a lower bearing portion such as 144 journaled in a corresponding hinge bracket such as 137 and is provided with a thrust collar such as 145 resting on the upper face of the cooperating bearing. On the lower end of each of the jack screws such as 142 is secured a worm wheel 146 in driven mesh with a respectively cooperating worm 147 which is secured to and adapted to be rotated by the shaft 136. The left hand end (Figs. 15 and 16) of the shaft 136 extends outwardly beyond the side frame 1′ and is provided with a hand wheel 148 which is secured thereto and adapted to provide means for rotating the shaft 136 to thereby cause rotation of the worms such as 147 which effect the rotation of the jack screws 142—143 and the vertical raising or lowering of the blocks 140—141. These blocks carry secured rigidly thereto a side wall bracket 149 (Figs. 17 and 18) which serves as an upwardly extending continuation of the lower housing portion 26′ and whose lower edge is in adjustable sealed engagement with the said lower housing portion 26′; the outer edges of said wall bracket 149 being in sealed engagement with the inner faces of the respective side frames 1′ and 2′. Accordingly, it will be seen that provision has been made for the vertical upward and downward adjustment of this side wall portion. Also, it will be understood that this side wall portion may be swung outwardly as indicated in Fig. 18 about the shaft 136 as a pivotal axis.

The wall portion 149 is held in its upper position (Figs. 15 and 16) by suitable latch mechanism as follows. Suitable wedge projections 150, 151 are formed rigid with the side wall bracket portion and extend outwardly so as to come into engagement with suitable abutments provided by the frame structure and are engageable by wedge plates 152 and 153 which are slidably supported on the frame structure and are moved into and out of operative position by suitable handles 154, 155.

The wall portion bracket 149 is provided with a slide groove in which is slidably positioned a reciprocable slide bar 156 which is held in position within the slide groove by means of the members 140—141 and a suitable intermediate plate 157 secured to the wall bracket 149. A pair of hinge brackets 158 and 159 are rigidly secured to the slide bar 156. These hinge brackets provide shelf supports such as (Fig. 18) 159′ for supporting suitable doctor knife holder 161 carried thereby and between which is clamped the doctor 59′, and the said clamping bars and doctor are held in position by plates such as 162. The construction and manner of mounting the doctor 159′ is in all respects similar to the construction and manner of mounting of the doctor 59 previously described. A pair of downwardly extending arms 163, 164 are formed integral with the brackets 158, 159 respectively, and carry interposed between them and pivotally supported from their lower ends a cam roller 165.

Figures 15, 16:
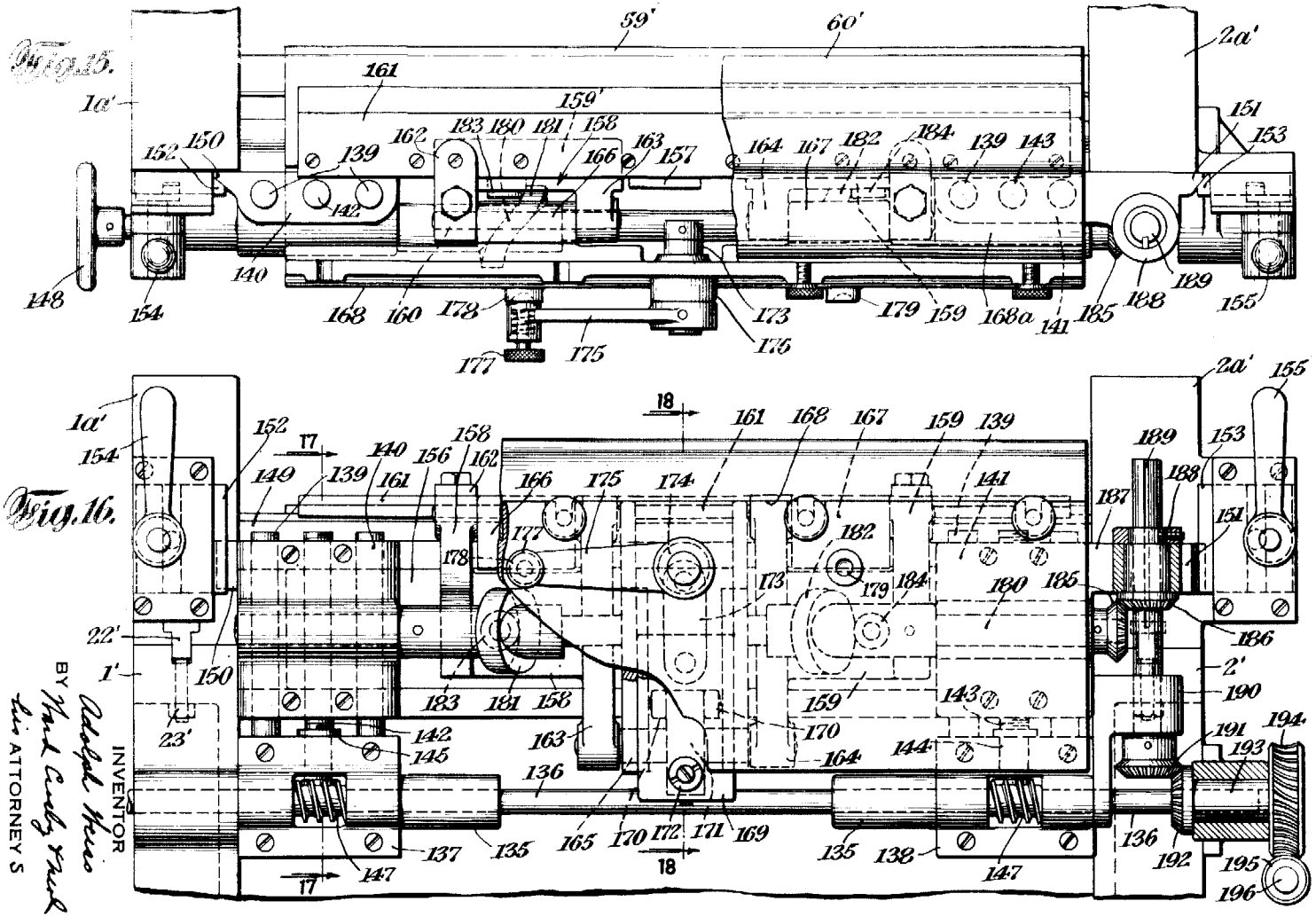
Fig. 15 is a plan view of the structure shown in Fig. 14 and illustrates certain features of a modified mechanism for reciprocating the doctor.
Fig. 16 is a side elevation of the structure shown in Fig. 15.

Mounted on the pivot shaft 160 and interposed between the bifurcated ribs of the hinge brackets 158 and 159 respectively are hinge plates 166, 167 which carry rigidly secured thereto an apron 168 provided with suitable bosses engaging the face of said hinge plates as best illustrated in Figs. 17 and 16; thereby serving to support said apron 168 pivotally about the shaft 160. This apron is substantially coextensive in length with the doctor, and being supported from the doctor slide reciprocates therewith. Between the top portion of the hinge plates 166 and 167 and the uppermost point of the apron 168 is provided a recess and suitable seat for the doctor pressure blade carrier 168a which carries the doctor pressure blade 60′ rigidly clamped thereto and arranged in position with respect to the doctor 59′ in the manner similar to that heretofore described in conjunction with Figs. 4 and 8. The member 168a is in effect an upward continuation of the apron 168, being rigidly clamped therein by suitable thumb screws to provide a means for readily removing the doctor knife holder for purposes of replacement or adjustment.

The apron carries slidably supported therein intermediate its ends a slide plate 169 which carries a pair of lugs 170 from which is pivotally supported a downwardly extending cam wedge 171 which is adapted to engage the cam roller 165. A suitable adjusting lock means 172 is provided for adjusting the desired position of the cam wedge 171; which as will be understood serves to furnish the desired operating adjustment of the pressure blade on the doctor. For the purposes of providing a quick release of the pressure blade from its adjusted position, while leaving the operative adjustment undisturbed, the following provision is made. The slide plate 169 carries pivotally connected adjacent its upper end a link 173 whose upper end is pivotally mounted on the inner crank end of an eccentric crank 174 which is rigidly secured in the hub of a crank handle 175 which is suitably journaled in a boss 176 formed integral with the apron 168 (Fig. 18). The outer end of the crank handle 175 carries detent means 177 providing locking engagement with cooperating bosses 178 and 179 for holding the crank handle in the desired position. The parts as shown in Figs. 15 and 16 and in solid line position in Fig. 18 serve to hold the doctor pressure blade in operative position; while if the detent is released from the lug 178 (Fig. 15) and the handle 175 rotated in a clockwise direction until the detent is made to engage the boss 179, the slide plate 169 is raised and the cam wedge 171 lifted to thereby permit the apron 168 and the integrally connected doctor pressure blade portion 168a to move about the pivot point 160 in a clockwise direction as indicated in the dotted position in Fig. 18, which position it will be understood is assumed when the entire wall bracket portion is swiveled about its hinge portion 136.

*Doctor reciprocation*

As will be seen from Figs. 15, 16 and 17, the blocks 140 and 141 are provided with suitable bearings in which is rotatably supported a shaft 180. This shaft carries a pair of cam plates 181, 182 secured thereto and rotatable therewith; and these cams are in cooperative engagement with respective cam rollers 183, 184 which are mounted on the doctor slides 156 and through the means of which the slide is caused to reciprocate, it being understood that the cams are so formed and positioned as to cause the reciprocation of the doctor slide throughout the desired travel. It is also noted that in the reciprocation in one direction one of the cams only is active, while in the reciprocation in the opposite direction the other cam only is active, this providing a very desirable means of getting a direct positive drive and of eliminating lost motion, since the positions of the respective cams may be adjusted independently to control the extent of travel of the side in one or the other of its two positions.

The right hand end of the shaft 180 projects beyond the block 141 and carries secured thereto a bevel gear 185 which is in driven mesh with a cooperating bevel gear 186 journaled in a supporting bracket 187 which is formed integral with the block 141 and is held thrust-wise therein by means of a suitable collar 188. The hub of the gear 186 is in splined engagement with a vertical shaft 189, which is suitably journaled in a bracket 190 which is pivoted on shaft 136 and which carries fixed on its lower end bevel gear 191 in mesh with a cooperating bevel gear 192 provided with a hub portion 193 suitably journaled in the supporting structure such as the side frame 2′ and carrying secured to its outer end a worm wheel 194 in driven engagement with a worm 195 carried on shaft 196, which is rotated by suitable means (not shown). It might be mentioned here in passing that the hub 193 is hollow and serves as a bearing for the shaft 136. From the foregoing it will be seen that the driving train for effecting the doctor reciprocation is so arranged and positioned that it is uninterrupted at all times while permitting the hinged movement back and forth of the side wall brackets and doctor mechanism carried thereby and also permits the vertical adjustment of the wiping mechanism as indicated in Fig. 17; and as has been previously pointed out in connection with the previously described embodiment of the invention this feature is of great importance.

*Modification of inking system*

Under certain conditions, it is desirable to provide independent fluid reservoirs situated remotely from the ink housing, and provision for this is illustrated in Fig. 19. This system may be referred to as a dry sump system.

The distributor head designated in its entirety as 28 is connected with a main conduit line 197 through which ink is forced by means of a feed supply pump 198, which has its inlet side connected by a pipe 199 to a suitable valve 200, which serves to connect the pipe 199 selectively with either the pipe 201 or the pipe 202; the pipe 201 being in fluid communication with the lower portion of the ink reservoir compartment 203, and the pipe 202 being in fluid communication with the lower portion of the solvent reservoir compartment 204. The lower portion 26 of the ink housing is diagrammatically illustrated and the outlet pipe 205 is in fluid communication therewith and at its opposite end is in fluid communication with the withdrawal pump 206 whose outlet side is connected by a pipe 207 to a suitable valve 208, which serves selectively to place the pipe 207 in communication with a scavenging pipe 209 or with the reservoir pipe 210, which is connected to a suitable valve 211 which serves selectively to place the pipe 210 into communication with an ink return pipe 212 or a solvent return pipe 213; the pipe 212 returning the fluid to the upper portion of the ink reservoir 203 and the pipe 213 serving to return the fluid to the upper portion of the solvent reservoir 204. The pumps operate in such a manner that the ink is withdrawn from the sump 26 at such a rate as to prevent accumulation of ink therein and thereby effect a dry sump. The ink so withdrawn is returned to the reservoir means from where it is withdrawn by the pump 198 and forced through the pipe 197 into the distributor head 28.

*Housing modification—ends independent of press frames*

Figure 20:
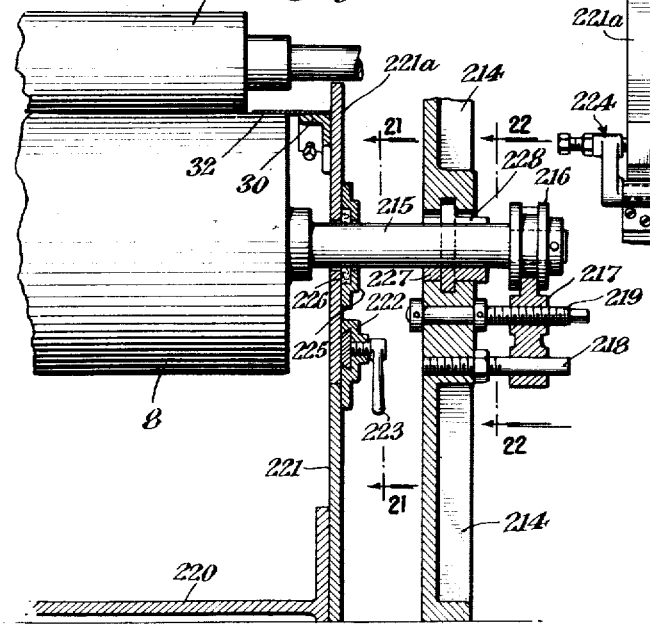
Fig. 20 (Sheet 2) is an elevation partly in section taken axially of the printing cylinder and illustrating a modification of the ink housing in general.
Figure 21:
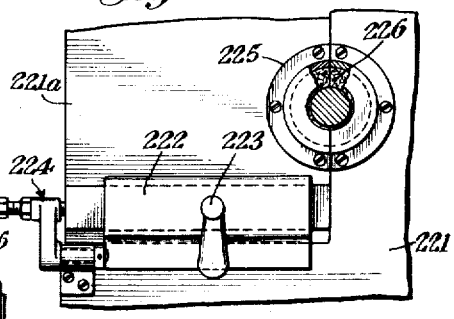
Fig. 21 is a sectional view of a part of the structure of Fig. 20 taken at 21—21 of Fig. 20.
Figure 22:
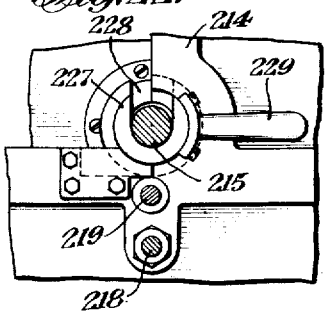
Fig. 22 is a sectional view taken at 22—22 of Fig. 20 showing further details of the structure there illustrated.

In certain instances it is desirable or necessary, particularly as where already designed or built machines are to be adapted to my invention, to have main supporting frames independent of the ink housing, or at least not to depend on these structural members for the additional function of the ink housing. Provision for this is illustrated in Figs. 20, 21 and 22. Referring more particularly to Fig. 20: The printing cylinder is supported from the side frames of the machine in suitable journals formed therein, one of the side frames being indicated as 214, and the cylinder shaft end 215 adjacent this side of the machine projects outwardly beyond the frame and carries on its outer end a grooved collar 216, which is engaged by an adjusting lug 217 slidably mounted on suitable guide bar means designated as 218 and engaged by an adjusting screw 219 suitably journaled in the frame 214 and provided at its outer end for engagement with a suitable crank or wrench. By rotation of the screw 219, the block 217 is moved inwardly or outwardly to thereby adjust the printing cylinder in desired axial position, for purposes well understood in the art. The lower portion of the ink housing is designated as 220 and may be formed and constructed in the manner previously described. However, instead of the lower housing portion being in sealed engagement with the side frames as heretofore described, it is in sealed engagement with end wall portions, one of which is designated as 221. This ink housing is supported from the floor by means of pedestal flanges or legs, which in the present embodiment are formed integral with the lower portion 220 and end wall portions 221 (Fig. 20); thereby supporting the ink housing with its bottom spaced from the floor as clearly illustrated. These end wall portions are formed with removable panels such as 221*a* comparable to the removable panel such as 1*a* in the frame 1 as shown in Fig. 3, and in like manner providing for ready removability of the printing cylinder in its assembled condition; it being noted that the frame 214 is cut away to permit the removal of the cylinder and its shaft, as will be more clearly described following. The details of construction of the removable panels of the housing ends will now be described more fully.

Referring to Fig. 21: The main member is provided with a dovetail guide 222 on which is slidably seated a cooperating dove tail formed integral with the panel 221*a*, and suitable clamping means such as 223 is provided for clamping the parts in adjusted position when once assembled; and in order to assure the parts being retained in this position of adjustment lock means, such as 224, is provided, it being pivotally attached to the main portion 221 so as to swing out of the way during the removal of the panel. The main body and the panel of the end wall are provided with half portions of a suitable housing 225 which carries a sealing ring 226 made of felt or other suitable material for effecting a seal between the shaft 215 and the housing end. Referring to Fig. 22: The side frame portion 214 is cut out and the journal bearing of the shaft 215, designated as 227, is provided with a peripheral flange seated in a cooperating recess formed in the side frame 214 and this bearing is provided with an opening 228 which in normal operative position is positioned upwardly as shown in Fig. 22, and which is adapted to be rotated to a horizontal position when it is desired to remove the cylinder, as by means of a handle 229.

With reference to the wiping mechanism (Figs. 11, 17 and 18), it is to be particularly noted that the doctor such as 59 (or 59') and its cooperating pressure blade such as 60 (or 60') are rigidly held by their respective supporting means in parallelism with respect to an axially extending line on the printing cylinder surface. Also, that these supporting means such as the wall bracket 49 (or 149) and parts cooperating therewith are so positioned, arranged and constructed that the doctor will be held and maintained in said parallelism at all operative positions of adjustment of the doctor and cooperating parts.

Having thus described my invention with particularity with reference to the preferred method of carrying out the same and in connection with the preferred apparatus for carrying out the same, it will be obvious to those skilled in the art, after understanding my invention, that other changes and modifications may be made therein without departing from the spirit and scope of my invention, and I aim in the appended claims to cover such changes and modifications as are within the scope of the invention.

What I claim is:

1. In a rotary intaglio printing press, the combination of a press supporting structure comprising side frames, a rotary intaglio printing cylinder having a drive shaft, said shaft being journaled in and said cylinder supported by said side frames, ink housing means comprising portions of said frames contiguous said journals and additional members cooperating therewith, said cylinder having a portion of its periphery within said housing means for the application of ink to said cylinder, and said housing means and said cylinder providing an enclosure adapted to prevent substantial evaporation of the volatile ingredients from said ink.

2. In a rotary intaglio printing press, the combination of a press supporting structure comprising side frames, a rotary intaglio printing cylinder having a drive shaft, said shaft being journaled in and said cylinder supported by said side frames, ink housing means formed as a unit and comprising end walls formed separately from said side frames and in sealing relationship with the cylinder shaft, said housing including additional means cooperating with said end walls and the respective end portions of the cylinder, said cylinder having a portion of its periphery within said housing means for the application of ink to said cylinder, and said housing means and said cylinder providing an enclosure adapted to prevent substantial evaporation of the volatile ingredients from said ink.

3. In a rotary intaglio printing press, the combination of a press supporting structure comprising side frames, a rotary intaglio printing cylinder having a drive shaft, bearing means removably supported in said side frames, said drive shaft being positioned in said bearing means for supporting said cylinder from said side frames, said bearing means being in sealed engagement with said side frames and with said drive shaft, ink housing means comprising said bearing means and contiguous portions of said side frames and additional members in cooperative sealed engagement therewith, said cylinder having a portion of its periphery within said housing means for the application of ink to said cylinder, and said housing means and said cylinder providing an enclosure adapted to prevent substantial evaporation of the volatile ingredients from said ink.

4. In a rotary intaglio printing press, the combination of a main frame supporting structure comprising side frames, a rotary printing cylinder having a drive shaft, bearing means removably supported respectively in said side frames, oppositely extending portions of said drive shaft being positioned respectively in said journal means for supporting said cylinder from said side frames and said cylinder, drive shaft and bearing means being removable bodily from said supporting structure, said bearing means being in sealed engagement with respective side frames and with contiguous portions of said drive shaft, ink housing means comprising said bearing means and contiguous portions of said side frames and additional members in cooperative sealed engagement therewith, said cylinder having a portion of its periphery within said housing means for the application of ink to the printing surface of said cylinder, and said housing means and said cylinder providing an enclosure adapted to prevent substantial evaporation of the volatile ingredients from said ink.

5. In a rotary intaglio printing press, the combination of a main frame supporting structure comprising side frames having respective bearings, a rotary intaglio printing cylinder having a drive shaft supported in said bearings, said side frames having removable panels in sealed communication with said side frames and with said drive shaft and adapted to permit ready removal of said cylinder and drive shaft bodily, ink housing means comprising said removable panels and contiguous portions of said side frames and additional members in cooperative sealed engagement therewith, said cylinder having a portion of its periphery within said housing means for the application of ink to said cylinder, and said housing means and said cylinder providing an enclosure adapted to prevent substantial evaporation of the volatile ingredients from said ink.

6. In a rotary intaglio printing press, the combination of a main frame supporting structure comprising side frames, a rotary intaglio printing cylinder having a drive shaft, bearing means removably supported respectively in said side frames, said drive shaft being positioned in said journal means for supporting said cylinder from said side frames, said side frames respectively having removable panels to provide for said cylinder said drive shaft and said bearing means being removable bodily from said supporting structure, said bearing means being in sealed engagement with said panels and contiguous side frame portions and with contiguous portions of said drive shaft, ink housing means comprising said bearing means and contiguous portions of said side frames and additional members in cooperative sealed engagement therewith, said cylinder having a portion of its periphery within said housing means for the application of ink to said cylinder, and said housing means and said cylinder providing an enclosure adapted to prevent substantial evaporation of the volatile ingredients from said ink.

7. In a rotary intaglio printing press, the combination of a press supporting structure comprising side frames, a rotary intaglio printing cylinder having a drive shaft, said shaft being journaled in and said cylinder supported by said side frames with opposite ends of said shaft projecting respectively beyond the outer faces of said frames and opposite ends of said cylinder respectively spaced from the inner faces of said frames, ink housing means comprising portions of said frames contiguous said journals and additional members cooperating therewith, said cylinder having a portion of its periphery within said housing means for the application of ink to said cylinder, said housing means and said cylinder providing an enclosure adapted to prevent substantial evaporation of the volatile ingredients from said ink, means for adjusting the lateral position of said cylinder, said means being supported from one of said frames adjacent the outer face thereof and being operatively connected to one of said outwardly projecting shaft ends.

8. In a rotary intaglio printing press, the combination of a press supporting structure comprising side frames, a rotary intaglio printing cylinder having a drive shaft and being supported by said side frames, an axially adjustable bearing box carried in one of said frames and serving as a journal for one end of said shaft, said cylinder having its opposite ends respectively spaced from the inner faces of said frames, ink housing means comprising said box and portions of said frames adjacent said cylinder ends and additional members cooperating therewith, said cylinder having a portion of its periphery within said housing means for the application of ink to said cylinder, said housing means and said cylinder providing an enclosure adapted to prevent substantial evaporation of the volatile ingredients from said ink, thrust lock means between said bearing box and drive shaft, and means associated therewith to adjust the axial position of said bearing box to thereby vary the lateral position of said cylinder.

9. In a rotary intaglio printing press, the combination of a main frame supporting structure comprising side frames, a rotary intaglio printing cylinder supported by said frames, a pair of end sealers in respective sealing contiguity with said frames and with the outer periphery of said cylinder, ink housing means comprising portions of said frames contiguous said journals and said end sealers and additional members in cooperative sealed engagement therewith, said cylinder having a portion of its periphery within said housing means for the application of ink to said cylinder, and said housing means and said cylinder providing an enclosure adapted to prevent substantial evaporation of the volatile ingredients from said ink.

10. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, said housing means comprising arcuate extensions between respective end walls of said housing and respectively adjacent ends of said printing cylinder and being in overlapping sealing contiguity with the peripheral surface of said printing cylinder, whereby the printing cylinder may be adjusted axially with respect to the housing to provide for registration while maintaining the closure of the housing.

11. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, said housing means comprising a reciprocable doctor and also comprising two relatively thin arcuate members extending inwardly from respective end walls of said housing and being in sealing engagement with the peripheral surface of said printing cylinder adjacent respective ends thereof and lying between said surface and said doctor.

12. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, said housing means comprising a reciprocable doctor and also comprising two end sealers each having a rigid supporting bracket and a relatively thin flexible arcuate member, said brackets being removably attached to the inner faces of respective end walls of said housing and said relatively thin arcuate members extending inwardly from respective end walls of said housing and being in sealing engagement with the peripheral surface of said printing cylinder adjacent respective ends thereof and lying between said surface and said doctor.

13. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, wiping mechanism, said housing means comprising a relatively fixed side wall portion, a movable wall portion adjustable upwardly and downwardly relative to said fixed wall portion, and a wall bracket extending upwardly from and hinged to said adjustable wall portion and serving to support said wiping mechanism.

14. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, wiping mechanism comprising a reciprocable doctor, a drive shaft for effecting said reciprocation, said housing means comprising a relatively fixed side wall portion, a movable wall portion adjustable upwardly and downwardly relative to said fixed wall portion, and a wall bracket extending upwardly from and hinged to said adjustable wall portion about said drive shaft and serving to support said wiping mechanism.

15. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, wiping mechanism comprising a reciprocable doctor, drive means for effecting said reciprocation, said housing means comprising a wall bracket hinged to a relatively lower side wall portion and serving to support said wiping mechanism for pivotal movement about the axis of said hinge, said drive means comprising operatively connected driving and driven members adapted to maintain a driving connection during said pivotal movement of said wiping mechanism.

16. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, wiping mechanism comprising a reciprocable doctor, said housing means comprising a wall bracket pivotally supported on a side wall of said housing and forming an upward extension of said wall and serving to support said wiping mechanism.

17. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, wiping mechanism comprising a reciprocable doctor, said housing means comprising an upwardly and downwardly adjustable wall bracket pivotally supported on a side wall of said housing and forming an upward extension of said wall and serving to support said wiping mechanism.

18. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, wiping mechanism comprising a reciprocable doctor, said housing means comprising an upwardly and downwardly adjustable wall bracket pivotally supported on a side wall of said housing and forming an upward extension of said wall and serving to support said wiping mechanism, and means for effecting said adjustment to vary the vertical position of said wall bracket, said last means comprising the pivotal support of said wall bracket.

19. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, said housing means comprising a hinged upper side wall portion, means for supplying ink to said cylinder and supported by said hinged wall portion and movable therewith.

20. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, said housing means comprising an upwardly and downwardly adjustable upper side wall portion, means for supplying ink to said cylinder and supported by said adjustable wall portion and movable therewith to vary the vertical position of said ink supplying means.

21. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, said housing means comprising a hinged median side wall portion and an upwardly and downwardly adjustable upper side wall portion movable therewith about said hinge, means for supplying ink to said cylinder and supported by said adjustable wall portion and movable therewith to vary the vertical position of said ink supplying means.

22. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, an inking head having a slot-like orifice extending in a direction axially of said cylinder, said head being removably mounted adjacent the upper portion of a side wall of said housing.

23. In a rotary intaglio printing press, the combination of a rotary intaglio printing cylinder and wiping means therefor, said wiping means comprising a thin resilient wiping blade, means for rigidly holding one edge portion of said blade with the other or wiping edge portion of said blade freely extending beyond said rigid holding means in a direction toward but unsupported by said cylinder, and means for flexing said overhanging edge portion out of said freely extending position to urge the wiping edge into wiping engagement with the printing surface of said cylinder.

24. In a rotary intaglio printing press, the combination of a rotary intaglio printing cylinder and wiping means therefor, said wiping means comprising a thin resilient wiping blade, means for rigidly holding one edge portion of said blade with the other or wiping edge portion of said blade extending beyond said rigid holding means in a direction toward said cylinder, and means for holding said extending edge portion in arcuate cross sectional form, with the wiping edge directed more nearly radial than tangential relative to said cylinder and into wiping engagement with the printing surface of said cylinder.

25. In a rotary intaglio printing press, the combination of a rotary intaglio printing cylinder and wiping means therefor, said wiping means comprising a thin resilient wiping blade, means for rigidly holding one edge portion of said blade with the other or wiping edge portion extending toward said cylinder in a more nearly tangential than radial direction, and means for flexing said extended and unsupported portion into arcuate cross sectional form to stiffen the same and to direct and hold said wiping edge in a relatively more radial position and in wiping engagement with the printing surface of said cylinder during normal operation.

26. In a rotary intaglio printing press, the combination of a rotary intaglio printing cylinder and wiping means therefor, said wiping means comprising a thin resilient wiping blade, means for rigidly holding one edge portion of said blade with the other or wiping edge portion extending toward but free from supported engagement with said cylinder, and means for flexing said extended and unsupported portion into concave form, as viewed from that portion of the printing surface moving toward wiping position, to stiffen the same and to hold said wiping edge in wiping engagement with the printing surface of said cylinder.

27. In a rotary intaglio printing press, the combination of a rotary intaglio printing cylinder and wiping means therefor, said wiping means comprising a thin resilient blade, means for rigidly holding one edge portion of said blade in a fixed plane with the other or wiping edge portion of said blade extending beyond said rigid holding means in a direction toward said cylinder, and means independent of said cylinder for flexing said overhanging edge portion out of said plane and its wiping edge into wiping engagement with the printing surface of said cylinder.

28. In a rotary intaglio printing press, the combination of a rotary intaglio printing cylinder and wiping means therefor, said wiping means comprising a thin resilient blade, means for holding one edge portion of said blade in a fixed plane with the other or wiping edge portion of said blade extending beyond said holding means in the direction of rotation of said cylinder, and means independent of said cylinder for flexing said overhanging edge portion out of said plane into a substantially arched cross section to provide body rigidity to said blade.

29. In a rotary intaglio printing press, the combination of a rotary intaglio printing cylinder and wiping means therefor, said wiping means comprising a thin resilient blade rigidly held along one edge portion in a plane parallel to the printing surface of said cylinder with the other or wiping edge portion of said blade extending freely in the direction of rotation of said cylinder, a less resilient pressure blade positioned above said first blade with one edge rigidly held in a plane parallel to the printing surface of said cylinder, the holding means for one of said blades being relatively fixed with respect to the other and the other of said holding means being adjustable while maintained in said parallelism to the printing surface of said cylinder, said adjustment serving to flex the overhanging portion of said first blade into a substantially arched cross section with the wiping edge of said blade lying parallel to and in wiping position relative to the surface of said printing cylinder, whereby through said adjustment said wiping edge may be placed in the desired wiping position and yieldingly held therein by means of blade resiliency.

30. In a rotary intaglio printing press, the combination of a rotary intaglio printing cylinder and wiping means therefor, said wiping means comprising a thin resilient blade, means for rigidly holding one edge portion of said blade with the other or wiping edge portion of said blade freely extending beyond said rigid holding means in a direction toward said cylinder, said freely extending wiping edge in its normal non-wiping position being spaced away from the printing surface of said cylinder, and means for flexing said overhanging edge portion out of said freely extending position and its wiping edge into wiping engagement with the printing surface of said cylinder.

31. In a rotary intaglio printing press, the combination of a rotary intaglio printing cylinder and reciprocating wiping means therefor, said wiping means comprising a thin resilient blade, means for rigidly holding one edge portion of said blade in a flexed plane of reciprocation with the other or wiping edge portion of said blade extending beyond said rigid holding means in a direction toward said cylinder, and a reciprocable pressure blade pivotally mounted and adapted to flex said overhanging edge portion out of said plane and its wiping edge into wiping engagement with the printing surface of said cylinder.

32. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of volatile ingredients from said ink, reciprocating wiping means for said cylinder, said wiping means comprising a thin resilient blade, means for rigidly holding one edge portion of said blade in a fixed plane of reciprocation with the other or wiping edge portion of said blade extending beyond said rigid holding means in a direction toward said cylinder, and a reciprocable pressure blade pivotally mounted and adapted to flex said overhanging edge portion out of said plane and its wiping edge into wiping engagement with the printing surface of said cylinder, and a flexible sealing blade positioned beneath said thin resilient wiping blade and carried by and forming a part of said housing means and adapted to be flexed downwardly by said wiping blade when the latter is in operative wiping position.

33. In a rotary intaglio printing press, the combination of a rotary intaglio printing cylinder and means for wiping said cylinder, said wiping means comprising a plurality of resilient blades arranged in superimposed relation and having their correspondingly contiguous outer edge portions rigidly held and their correspondingly contiguous inner edge portions freely extended beyond the rigidly held portions in a direction toward said cylinder, and means for forcibly curving the contiguous inner edge portions of said blades downwardly to bring the wiping edge of one of said blades into wiping engagement with the printing surface of said cylinder.

34. In a rotary intaglio printing press, the combination of a rotary intaglio printing cylinder; distributing means for supplying ink to said cylinder under pressure, said distributing means comprising a main arterial inlet divided into a plurality of liquid channels for directing the flow of ink in a plurality of fluid streams and which channels diverge laterally from said main inlet and terminate in a linear series of closely adjacent outlets of substantially uniform delivery capacity arranged axially of said cylinder and directed transversely of the printing surface of said cylinder; and means external said distributing means for feeding ink under pressure to said arterial inlet and through said distributing means.

35. In a rotary printing press, the combination of a rotary printing cylinder, a fountain housing within which a portion of the periphery of said cylinder is positioned and a bottom portion of which serves to catch surplus fluid from said cylinder, a nozzle having a slot-like orifice contiguous to the upper area of said cylinder to feed fluid to the printing surface of said cylinder adjacent the printing zone thereof, and means for supplying fluid to said nozzle, fluid reservoir means separate from and spaced from said housing, pump means for supplying fluid under pressure from said reservoir to said supply means, and separate pump means for returning fluid under pressure from said bottom portion of said housing to said reservoir means.

36. In the art of rotary printing, the method of supplying printing fluid to the printing surface of a printing cylinder in a fluid stream which comprises causing said fluid to flow toward said surface from a point relatively removed from said cylinder, sub-dividing said fluid into a multiplicity of closely adjacent individual streams arranged in a linear series extending axially of said cylinder, converging said individual streams into a homogeneous fluid body substantially co-extensive with said linear series, then forming said linear fluid body into a relatively thin stream closely adjacent said cylinder surface and extending in a continuous line axially of said cylinder, and delivering said fluid to said printing surface in a continuous stream extending in a continuous line axially of said printing surface and having a uniform rate of flow throughout its length.

37. In a rotary printing machine, the combination of a rotary printing cylinder, a conduit providing a main artery for printing fluid, means for forcing said fluid through said conduit toward said cylinder, and fluid distributing means having a main arterial inlet in fluid communication with said conduit, said distributing means also having a series of secondary passages in communication with and branching outwardly from the said inlet and a plurality of successive series of passages successively communicating with and branching outwardly from respectively preceding passages, said last series of passages being arranged in a direction axially of said cylinder with respectively contiguous passages lying closely adjacent each other and in communication at their outlet ends with an equalizer or header chamber terminating in an outlet orifice in the form of a long narrow slot adapted to discharge printing fluid onto the printing surface of said cylinder.

38. In a rotary printing machine, the combination of a rotary printing cylinder, a conduit providing a main artery for printing fluid, means for forcing said fluid through said conduit toward said cylinder, and fluid distributing means having a main arterial inlet in fluid communication with said conduit, said distributing means also having a series of secondary passages in communication with and branching outwardly from the said inlet and a plurality of successive series of passages successively communicating with and branching outwardly from respectively preceding passages, said last series of passages being arranged in a direction axially of said cylinder with respectively contiguous passages lying closely adjacent each other and in communication at their outlet ends with an equalizer or header chamber terminating in an outlet orifice in the form of a long narrow slot adapted to discharge printing fluid onto the printing surface of said cylinder, the cross-sectional area of each dividing passage being a proportioned reduction of its respectively preceding main passage.

39. In a rotary printing machine, the combination of a rotary printing cylinder, a conduit providing a main artery for printing fluid, means for forcing said fluid through said conduit toward said cylinder, and fluid distributing means having a main arterial inlet in fluid communication with said conduit, said distributing means also having a series of secondary passages in communication with and branching outwardly from the said inlet and a plurality of successive series of passages successively communicating with and branching outwardly from respectively preceding passages, said last series of passages lying closely adjacent each other and in communication at their outlet ends with an equalizer or header chamber terminating in an outlet orifice in the form of a long narrow slot adapted to discharge printing fluid onto the printing surface of said cylinder throughout substantially the entire length thereof, the respective volumes of said final fluid streams at their outlet ends being approximately equal each to the other and the respective paths of travel of said streams from the point of first division to their outlet ends being of approximately the same linear distance.

40. In a rotary intaglio printing machine, the combination of a rotary intaglio printing cylinder, fluid distributing means for distributing ink lengthwise of said cylinder, means for forcing said ink to said distributing means, said ink distributing means having a pressure equalizing chamber and a discharge nozzle in communication therewith and provided with a long narrow orifice extending lengthwise of said cylinder, said nozzle being positioned and directed so as to discharge said ink onto the printing cylinder in a direction transverse to the direction of travel of the printing surface of said cylinder and being inclined downwardly to permit gravitational drainage of said ink from said nozzle.

41. In a rotary printing press, the combination of a rotary printing cylinder, an ink distributing manifold for supplying printing fluid to said cylinder, said manifold having a discharge orifice in the form of a long narrow slot extending in a direction axially of said cylinder contiguous the periphery thereof and located above the axis of said cylinder, the walls of said orifice being out of contact with the printing surface of said cylinder, and means for feeding ink from a source of supply to said manifold.

42. In a rotary printing press, the combination of a rotary printing cylinder, an ink distributing manifold for supplying printing fluid to said cylinder said manifold having a discharge orifice in the form of a long narrow slot extending in a direction axially of said cylinder contiguous the periphery thereof and located above the axis of said cylinder, said manifold having progressively sub-dividing passages arranged in substantially a common plane and said plane being inclined from the horizontal to permit free drainage thereof, and means for feeding ink from a source of supply to said manifold.

43. In a rotary intalgio printing press, the combination of a rotary intaglio printing cylinder, fountain housing means within which a portion of the periphery of said cylinder is positioned, an ink distributing manifold for supplying ink to said cylinder, said manifold having a discharge orifice in the form of a long narrow slot extending in a direction axially of said cylinder contiguous the periphery thereof and positioned within said housing means, a sealing strip having its active edge in sealing contiguity with said cylinder and lying closely adjacent to said discharge orifice for lubrication by the ink flowing from said orifice, said sealing strip forming a part of said housing means, and means for feeding ink to said manifold.

44. In a rotary intaglio printing press, the combination of a rotary intaglio printing cylinder, fountain housing means within which a portion of the periphery of said cylinder is positioned, an ink distributing manifold for supplying ink to said cylinder, said manifold having a discharge orifice in the form of a long narrow slot extending in a direction axially of said cylinder contiguous the periphery thereof and positioned within said housing means, a felt sealing strip having its active edge in sealing engagement with said cylinder and lying closely adjacent to said discharge orifice for lubrication by the ink flowing from said orifice, a metal holder removably supporting said felt strip in clamped condition against a face of said manifold nozzle, said sealing strip forming a part of said housing means, and means for feeding ink to said manifold.

45. In a rotary intaglio printing press, the combination of a rotary intaglio printing cylinder, fountain housing means within which a portion of the periphery of said cylinder is positioned for the application of ink to said cylinder, said housing means having a relatively rigid portion positioned closely adjacent to and extending lengthwise of said cylinder, a longitudinally extending member adjustably pivotally supported from said portion and provided with a downwardly extending flange rigidly formed therewith, a felt sealer strip rigidly attached to said longitudinal member adjacent its upper edge with its lower edge adapted to engage the surface of said cylinder, a flexible pressure blade pivotally supported from said longitudinal member lying adjacent said rigid portion and between the same and said felt sealer and between which and said downwardly extending flange of said longitudinally extending member said felt strip is adapted to be held in operative position, and means to adjust the position of said longitudinally extending member about its pivot point.

46. In a rotary intaglio printing press, the combination of a rotary intaglio printing cylinder, means for applying ink to the printing surface of said cylinder in a limited circumferential zone at a position above the cylinder axis and beyond the zone of printing in the direction of rotation of said cylinder, and wiping means comprising a wiping edge positioned for engaging said printing surface above the said axis and ahead of said printing zone in the direction of rotation of said cylinder.

47. In a rotary intaglio printing press, the combination of a rotary intaglio printing cylinder, a pressure roller cooperating with said cylinder, and means for applying ink to the printing surface of said cylinder in a limited circumferential zone in the first quadrant of said cylinder beyond said roller in the direction of rotation of said cylinder.

48. In a rotary intaglio printing press, the combination of a rotary intaglio printing cylinder, a pressure roller cooperating with said cylinder, means for applying ink to the printing surface of said cylinder in a limited circumferential zone in the first quadrant of said cylinder beyond said roller in the direction of rotation of said cylinder, and wiping means engaging said surface on the opposite side of said pressure roller from said ink applying means.

49. In the art of intaglio printing, the method of sustaining uniform tone strength of prints which comprises applying in an amount in excess of printing requirement a flow of ink containing volatile ingredients to a moving intaglio printing surface in a zone located in the direction of movement of said surface in the first quadrant beyond said printing zone, maintaining an excess of ink on said surface during the major portion of its entire path of travel, wiping excess ink from said surface ahead of and closely proximate to said printing zone, printing from said intaglio surface, and subjecting the unused ink film remaining on said surface to the soluble action of said flow of ink during said interval between application and wiping.

50. In a rotary intaglio printing press, the combination of a rotary intaglio printing cylinder, a relatively deep fountain chamber within which said cylinder is positioned for the application of ink to said cylinder, said chamber providing an ink reservoir and serving to catch excess ink from said cylinder, means for drawing the ink from adjacent the bottom of said chamber, and means for discharging said ink so withdrawn on to the surface of said cylinder in a continuous stream of substantially uniform flow per unit of length axially of said cylinder substantially parallel to the axis of said cylinder and in an amount in excess of printing requirements.

51. In a rotary intaglio printing press, the combination of a rotary intaglio printing cylinder, a relatively deep fountain chamber within which said cylinder is positioned for the application of ink to said cylinder, said chamber providing a fluid reservoir and serving to catch excess ink from said cylinder, means for drawing the ink from said reservoir and for maintaining the ink level in said reservoir below the lower surface of said cylinder, and means for discharging said ink so withdrawn on to the surface of said cylinder in a continuous stream of substantially uniform flow per unit of length axially of said cylinder substantially parallel to the axis of said cylinder and in an amount in excess of printing requirements.

52. In a rotary intaglio printing press, the combination of a rotary intaglio printing cylinder, a relatively deep fountain chamber within which said cylinder is positioned for the application of ink to said cylinder, said chamber providing a fluid reservoir and serving to catch excess ink from said cylinder, said reservoir having a plurality of discharge ports positioned in spaced series lengthwise thereof and interconnected to a common discharge conduit, means for drawing the ink from said reservoir through said conduit, and means for discharging said ink so withdrawn on to the surface of said cylinder in a continuous line extending axially thereof throughout substantially the entire length thereof.

53. In a rotary intaglio printing press, the combination of a rotary intaglio printing cylinder, a relatively deep fountain chamber within which said cylinder is positioned for the application of ink to said cylinder, said chamber providing a fluid reservoir and serving to catch excess ink from said cylinder, said reservoir having a plurality of discharge ports positioned in spaced series lengthwise thereof and interconnected to a common discharge conduit, means for drawing the ink from said reservoir through said conduit, and means for discharging said ink so withdrawn on to the surface of said cylinder in a continuous line extending lengthwise of said cylinder and in an amount substantially in excess of printing requirements.

54. In a rotary intaglio printing press, the combination of a rotary intaglio printing cylinder, ink housing means within which is positioned a portion of the periphery of said cylinder for the application of ink thereto, wiping mechanism comprising a reciprocable doctor, said housing means comprising a relatively fixed side wall portion, a movable wall portion adjustable upwardly and downwardly relative to said fixed wall portion, and a wall bracket extending upwardly from and hinged to said adjustable wall portion and serving to support said wiping mechanism.

55. In a rotary intaglio printing press, the combination of a rotary intaglio printing cylinder, ink housing means within which is positioned a portion of the periphery of said cylinder for the application of ink thereto, wiping mechanism comprising a reciprocable doctor, a drive shaft for effecting said reciprocation, said housing means comprising a relatively fixed side wall portion, a movable wall portion adjustable upwardly and downwardly relative to said fixed wall portion, and a wall bracket extending upwardy from and hinged to said adjustable wall portion about said drive shaft and serving to support said wiping mechanism.

56. In a rotary intaglio printing press, the combination of a rotary intaglio printing cylinder, ink housing means within which is positioned a portion of the periphery of said cylinder for the application of ink thereto, wiping mechanism comprising a reciprocable doctor, drive means for effecting said reciprocation, said housing means comprising a wall bracket hinged to a relatively lower side wall portion and serving to support said wiping mechanism for pivotal movement about the axis of said hinge, said drive means comprising operatively connected driving and driven members adapted to maintain a driving connection during said pivotal movement of said wiping mechanism.

57. In a rotary intaglio printing press, the combination of a rotary intaglio printing cylinder, ink housing means within which is positioned a portion of the periphery of said cylinder for the application of ink thereto, wiping mechanism comprising a reciprocable doctor, said housing means comprising a wall bracket pivotally supported on a side wall of said housing and forming an upward extension of said wall and serving to support said wiping mechanism.

58. In a rotary intaglio printing press, the combination of a rotary intaglio printing cylinder, ink housing means within which is positioned a portion of the periphery of said cylinder for the application of ink thereto, wiping mechanism comprising a reciprocable doctor, said housing means comprising an upwardly and downwardly adjustable wall bracket pivotally supported on a side wall of said housing and forming an upward extension of said wall and serving to support said wiping mechanism.

59. In a rotary intaglio printing press, the combination of a rotary intaglio printing cylinder, ink housing means within which is positioned a portion of the periphery of said cylinder for the application of ink thereto, wiping mechanism comprising a reciprocable doctor, said housing means comprising an upwardly and downwardly adjustable wall bracket pivotally supported on a side wall of said housing and forming an upward extension of said wall and serving to support said wiping mechanism, and means for effecting said adjustment to vary the vertical position of said wall bracket, said last means comprising the pivotal support of said wall bracket.

60. In a rotary intaglio printing press, the combination of a rotary intaglio printing cylinder, ink housing means within which is positioned a portion of the periphery of said cylinder for the application of ink thereto, said housing means comprising a hinged upper side wall portion, means for supplying ink to said cylinder and supported by said hinged wall portion and movable therewith.

61. In a rotary intaglio printing press, the combination of a rotary intaglio printing cylinder, ink housing means within which is positioned a portion of the periphery of said cylinder for the application of ink thereto, said housing means comprising an upwardly and downwardly adjustable upper side wall portion, means for supplying ink to said cylinder and supported by said adjustable wall portion and movable therewith to vary the vertical position of said ink supplying means.

62. In a rotary intaglio printing press, the combination of a rotary intaglio printing cylinder, ink housing means within which is positioned a portion of the periphery of said cylinder for the application of ink thereto, said housing means comprising a hinged median side wall portion and an upwardly and downwardly adjustable upper side wall portion movable therewith about said hinge, means for supplying ink to said cylinder and supported by said adjustable wall portion and movable therewith to vary the vertical position of said ink supplying means.

63. In a rotary intaglio printing press, the combination of a rotary intaglio printing cylinder, ink housing means within which is positioned a portion of the periphery of said cylinder for the application of ink thereto, an inking head having a slot-like orifice extending in a direction axially of said cylinder, said head being removably mounted adjacent the upper portion of a side wall of said housing to facilitate the removal of said cylinder from said housing.

64. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, wiping mechanism comprising a reciprocable doctor, a drive shaft for effecting said reciprocation, said housing means comprising a relatively fixed side wall portion and a wall bracket extending upwardly from and adjustable with respect to said relatively fixed side wall portion, said wall bracket being hingedly mounted about said drive shaft and serving to support said wiping mechanism.

65. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, wiping mechanism comprising a reciprocable doctor, said housing means comprising a pivotally supported wall bracket whose pivot point is positioned adjacent the upper extremity of a side wall of said housing and forming an upward extension of said wall and serving to support said wiping mechanism.

66. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, wiping mechanism comprising a reciprocable doctor, a drive shaft for reciprocating said doctor, said housing means comprising a wall bracket pivotally supported on said drive shaft and forming an upward extension of a side wall of said housing and serving to support said wiping mechanism.

67. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, wiping mechanism comprising a reciprocable doctor, said housing means comprising an upwardly and downwardly adjustable pivotally supported wall bracket whose pivot point is positioned adjacent the upper extremity of a side wall of said housing and forming an upward extension of said wall and serving to support said wiping mechanism.

68. In a rotary intaglio printing press, the combination of a rotary intaglio printing cylinder, a relatively deep fountain chamber with in which said cylinder is positioned for the application of ink to said cylinder, said chamber providing a fluid reservoir and serving to catch excess ink from said cylinder, said reservoir having a plurality of discharge ports positioned in spaced series lengthwise thereof and interconnected to a common discharge conduit, and means for drawing the ink from said reservoir through said conduit in an amount in excess of printing requirements and delivering the same to the surface of said cylinder, from which the excess is returned to the fluid body in said reservoir.

69. In a rotary intaglio printing press, the combination of a printing cylinder, an ink housing structure for the application of ink to said cylinder and for the wiping of said ink from same, said housing forming an enclosure around the major portion of said cylinder to effectively retard the evaporation of the volatile ingredients of said ink, said housing comprising a pair of frames for supporting said cylinder, a pair of end sealing members in fixed sealing contiguity with respect to said frames and in sealing contiguity with the respective outer peripheral ends of said cylinder, and other related sealing elements with which said end sealing members are also in sealing contiguity, said cylinder being laterally adjustable relative to the fixed position of said end sealing members and said end sealing members being adapted to maintain said sealing contiguity in the various adjusted positions of said cylinder.

70. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, wiping mechanism, said housing means comprising a relatively fixed side wall portion, a movable wall portion adjustable upwardly and downwardly relative to said fixed wall portion, and a wall bracket extending upwardly from and hinged to said adjustable wall portion and serving to support said wiping mechanism, said fixed wall portion having a sealing relationship with said movable wall portion in the various adjusted positions of the latter, and said hinged wall brackets having a sealing relationship with said movable wall portion in the normal operating position of said bracket.

71. In a rotary intaglio printing press, the combination of a rotary intaglio printing cylinder, ink housing means for the application of ink to said cylinder and for the wiping of said ink from said cylinder, said housing means forming an enclosure around the major portion of said cylinder adapted to prevent the substantial evaporation of the volatile ingredients of said ink, said housing means comprising a side wall and a wall bracket for the support of a wiping mechanism, said wall bracket constituting a pivotal extension of said side wall and having a sealing relationship with said side wall when said wall bracket is occupying its normal operating position, the pivot point of said bracket being positioned adjacent the upper extremity of a side wall of said housing.

72. In a rotary intaglio printing press, the combination of a rotary intaglio printing cylinder, ink housing means for the application of ink to said cylinder and for the wiping of said ink from said cylinder, said housing means constituting an enclosure around the major portion of said cylinder to prevent the substantial evaporation of the volatile ingredients of said ink, said housing means comprising a fixed side wall portion and a hinged wall bracket for the support of a wiping mechanism, said wall bracket being adjustable relative to said fixed wall portion and being adapted to have a sealing engagement with said fixed wall portion in all the adjusted positions of said bracket, when the latter is in its normal operating location.

73. In a rotary intaglio printing press, the combination of a rotary intaglio printing cylinder, housing means for the application of ink to said cylinder and for the wiping of said ink from said cylinder, said housing means forming an enclosure around the major portion of said cylinder to prevent the substantial evaporation of the volatile ingredients of said ink, said housing means comprising a fixed side wall portion and a hinged wall extension of the same for the support of an inking mechanism, said wall elements having a sealing relationship when occupying their normal operating position.

74. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, said housing means comprising a fixed side wall portion, a hinged wall extension of the latter and an additional adjustable wall portion movable relative to said hinged wall extension, said adjustable wall portion serving to support an inking mechanism, all of said wall elements having a sealing engagement when located in any of their adjusted normal operating positions.

75. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, said housing comprising a fixed side wall portion and a hinged wall extension of the latter for the support of an inking mechanism, said wall extension being adjustable relative to said fixed wall portion, all of said wall elements having a sealing engagement when located in their adjusted normal operating position.

76. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, said housing means comprising a hinged median side wall portion and an upwardly and downwardly adjustable upper side wall portion movable therewith about said hinge, means for supplying ink to said cylinder and supported by said adjustable wall portion and movable therewith to vary the vertical position of said ink supplying means and being in sealing engagement with said side wall when located in its normal operating position.

77. In a rotary intaglio printing press, the combination of a wiping mechanism comprising a reciprocating slide, a doctor knife fixedly mounted on said slide, a pressure apron pivotally mounted on said slide, said pressure apron having a pressure blade mounted on its upper extremity for the deflection of said doctor knife into a wiping position and said apron also providing a housing cover for said wiping mechanism.

78. In a rotary intaglio printing press, the combination of a wiping mechanism comprising a reciprocating slide, a doctor knife fixedly mounted on said slide, a pressure apron pivotally mounted on said slide and having a pressure blade mounted on its upper extremity and means to provide a pivotal movement to said pressure apron for the deflection of said doctor knife into a wiping position by said pressure blade.

79. In a rotary intaglio printing press, the combination of a wiping mechanism comprising a reciprocating slide, a doctor knife fixedly mounted on said slide, a pressure apron pivotally mounted on said slide and having a pressure blade mounted on its upper extremity and means to provide a pivotal movement to said pressure apron for the deflection of said doctor knife into a wiping position by said pressure blade, said last-mentioned means having a central wiping pressure regulating station.

80. In a rotary intaglio printing press, the combination of a wiping mechanism comprising a reciprocating slide, a doctor knife fixedly mounted on said slide, a pressure apron pivotally mounted on said slide and having a pressure blade mounted on its upper extremity and means to provide a pivotal movement to said pressure apron for the deflection of said doctor knife into a wiping position by said pressure blade, said last-mentioned means providing a central regulation of the wiping pressure of said doctor knife and providing means for quickly bringing said doctor knife selectively into and out of wiping position without affecting the said adjustment of the wiping pressure.

81. In a rotary intaglio printing press, the combination of a wiping mechanism comprising a reciprocating slide, a doctor knife fixedly mounted on said slide, a pair of links pivotally mounted on said slide, a pressure apron pivotally supported by said links, said apron having a pressure blade mounted on its upper extremity for the deflection of said doctor knife into its wiping position and also serving as a housing cover for said wiping mechanism, means for selectively locking said links to said slide to thereby secure said apron in its normal operating position and for unlocking said links to thereby permit said apron to be removed to expose said wiping mechanism to gain access to said doctor knife.

82. In a rotary intaglio printing press, the combination of an ink fountain chamber for the supply of a printing ink and an ink circulating system for the agitation of said ink, said system comprising a plurality of ports located adjacent the lowermost level of said fountain chamber for the withdrawal of several approximately uniform streams of ink from said fountain chamber and interconnected communicating channels adapted to unite said several streams into a single body to be discharged back into said fountain chamber.

83. In a rotary intaglio printing press, the combination of a printing cylinder, an ink fountain chamber for the supply of a printing ink and a circulating inking system for the agitation of said ink and for the inking of said cylinder, said system comprising a plurality of ports in communication with said fountain chamber for the withdrawal of several approximately uniform streams of ink from said chamber, means for uniting said streams into a single stream, means for redistributing said single stream into another plurality of substreams and means for converging said substreams into a single ribbon-like body to be discharged upon said cylinder and to return the surplus ink back into said fountain chamber.

84. In a rotary intaglio printing press, the combination of a rotary intaglio printing cylder, housing means for the supply of ink to said cylinder and for the wiping of said ink from said cylinder, said housing means forming an enclosure around said cylinder for the prevention of the substantial evaporation of the volatile ingredients of said ink, said housing means comprising a relatively fixed side wall portion and an upwardly extending wall bracket for the support of a wiping mechanism, a drive shaft for said wiping mechanism, said wall bracket being adjustable relative to said fixed wall portion and being pivotally supported, said pivot point being concentric with the axial center of said drive shaft and said side wall portion having a sealing engagement with said wall bracket in all of the adusted positions of the latter when it is in its normal operating position.

85. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, wiping mechanism comprising a reciprocable doctor, said housing means comprising a pivotally supported wall bracket whose pivot point is positioned adjacent the upper extremity of a side wall of said housing and forming an upward extension of said wall and serving to support said wiping mechanism, said side wall having a sealing engagement with said wall bracket when the latter occupies its normal operating position.

86. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, wiping mechanism comprising a reciprocable doctor, a drive shaft for reciprocating said doctor, said housing means comprising a wall bracket pivotally supported on said drive shaft and forming an upward extension of a side wall of said housing and serving to support said wiping mechanism, said side wall having a sealing engagement with said wall bracket when the latter occupies its normal operating position.

87. In a rotary intaglio printing press, the combination of a rotary intaglio printing cylinder, ink housing means within which is positioned a portion of the periphery of said cylinder for the application of ink thereto, said housing means and said cylinder providing an enclosure adapted to prevent substantial evaporation of the volatile ingredients from said ink, wiping mechanism comprising a reciprocable doctor, said housing means comprising an upwardly and downwardly adjustable wall bracket pivotally supported adjacent a side wall of said housing and forming an upward extension of said wall and serving to support said wiping mechanism, said side wall having a sealing engagement with said wall bracket in all of the adjusted positions of the latter when it is occupying its normal operating position.

88. In the art of rotary intaglio printing, the method of supplying printing ink to the printing surface of a printing cylinder to prepare the surface for the impression thereof upon the web, which comprises applying the ink forcefully to the printing surface beyond the point of impression in the direction of rotation and before the surface moves through 180° from the point of impression, said ink being in a continuous stream extending in a continuous line axially of the printing surface and causing said ink to encounter ink residue remaining on the cylinder after the printing operation, subsequently causing the ink to remain in solvent contact with the cylinder to dissolve such residue, and wiping excess ink from the cylinder just prior to the point of impression.

89. In a rotary intaglio printing press, the combination of a rotary intaglio printing cylinder having a supporting shaft, ink housing means within which is positioned a portion of the periphery of said cylinder for the application of ink thereto, said housing means and said cylinder providing an enclosure adapted to prevent substantial evaporation of the volatile ingredients from said ink, said housing means including relatively stationary housing portions and end walls having removable sections which coact with the stationary housing portions to maintain the closure and which coact with the cylinder shaft to form a seal therewith extending throughout half of the circumference of the shaft, whereby the cylinder may be removably supported for replacement and, while so supported, closure of the fountain may be maintained.

ADOLPH WEISS.

CERTIFICATE OF CORRECTION.

Reissue No. 21,212. September 19, 1939.

ADOLPH WEISS.

It is hereby certified that error appears in the printed specification of the above numbered patent requiring correction as follows: Page 2, second column, line 21, for "wiill" read will; page 6, first column, line 53, for "form" read worm; line 71, for "in" read is; page 9, first column, line 43, for "side" read slide; page 13, second column, line 43, claim 31, for "flexed" read fixed; page 15, first column, line 30, claim 43, for "intalgio" read intaglio; page 17, second column, line 1, claim 68, for "with in" read within; page 19, first column, line 28, claim 84, for "adusted" read adjusted; and that the said Letters Patent should be read with this correction therein that the same may conform to the record of the case in the Patent Office.

Signed and sealed this 24th day of October, A. D. 1939.

(Seal)

Henry Van Arsdale,
Acting Commissioner of Patents.

DISCLAIMER

Re. 21,212.—*Adolph Weiss*, Brooklyn, N. Y. ROTARY INTAGLIO PRINTING. Patent dated September 19, 1939. Disclaimer filed June 25, 1940, by the inventor.

Hereby enters this disclaimer to claims 7, 8, 9, 10, 11, 12, and 69 in said specification.

[*Official Gazette July 16, 1940.*]